(12) United States Patent
Nagatani

(10) Patent No.: US 11,385,492 B2
(45) Date of Patent: Jul. 12, 2022

(54) DISPLAY APPARATUS

(71) Applicant: SONY CORPORATION, Tokyo (JP)

(72) Inventor: Shinpei Nagatani, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/984,431

(22) Filed: Aug. 4, 2020

(65) Prior Publication Data

US 2021/0063787 A1 Mar. 4, 2021

(30) Foreign Application Priority Data

Aug. 27, 2019 (JP) .............................. JP2019-154326

(51) Int. Cl.
| | |
|---|---|
| *G02F 1/1334* | (2006.01) |
| *G02F 1/35* | (2006.01) |
| *G02F 1/03* | (2006.01) |
| *G02F 1/1333* | (2006.01) |

(52) U.S. Cl.
CPC .......... *G02F 1/1334* (2013.01); *G02F 1/3501* (2013.01); *G02F 1/0311* (2013.01); *G02F 1/133308* (2013.01); *G02F 1/3509* (2021.01)

(58) Field of Classification Search
None
See application file for complete search history.

(56) References Cited

U.S. PATENT DOCUMENTS

| | | | |
|---|---|---|---|
| 2004/0125451 A1* | 7/2004 | Miyatake | G02F 1/133504 359/489.01 |
| 2009/0079689 A1* | 3/2009 | Miyata | G09G 3/34 345/107 |
| 2009/0128451 A1* | 5/2009 | Tokui | G03B 21/2053 345/55 |
| 2010/0157413 A1* | 6/2010 | Dean | G02B 26/004 359/316 |
| 2013/0241860 A1* | 9/2013 | Ciesla | G06F 3/04895 345/173 |
| 2015/0261037 A1* | 9/2015 | Cho | G02F 1/133385 349/58 |
| 2016/0161823 A1* | 6/2016 | Kim | G02F 1/134309 349/15 |
| 2016/0282522 A1* | 9/2016 | Schiavoni | G02B 5/0294 |
| 2017/0079591 A1* | 3/2017 | Gruhlke | A61B 5/332 |
| 2017/0261778 A1* | 9/2017 | Lan | G02F 1/134309 |

* cited by examiner

*Primary Examiner* — Shan Liu
(74) *Attorney, Agent, or Firm* — Chip Law Group

(57) ABSTRACT

A display apparatus includes a display, a plate-like body, and a gap portion. The display is configured to display an image and having a front surface. The plate-like body is provided along the front surface of the display and configured to transmit image light emitted from the front surface of the display. The gap portion is formed between the front surface of the display and the plate-like body and configured to switch between a state filled with a fluid and a state where the fluid is discharged.

14 Claims, 20 Drawing Sheets

DISPLAY APPARATUS

CROSS REFERENCE TO RELATED APPLICATIONS

This application claims the benefit of Japanese Priority Patent Application JP 2019-154326 filed Aug. 27, 2019, the entire contents of which are incorporated herein by reference.

BACKGROUND

The present technology relates to a display apparatus, and more particularly, to a display apparatus for displaying an image.

Japanese Patent No. 4192900 discloses a display apparatus capable of switching a screen of a display panel for displaying an image, such as a liquid crystal display panel or an organic electro-luminescence (EL) display panel, to a mirror.

SUMMARY

As the screen size of a display panel of a television receiver or the like increases, the importance of the display panel as an indoor decorative article increases when it is turned off.

The present technology has been made in view of such a circumstance, and in particular, it is intended to improve the design property in a state where an image is not displayed.

According to a first embodiment of the present technology, there is provided a display apparatus including: a display configured to display an image and having a front surface; a plate-like body provided along the front surface of the display and configured to transmit image light emitted from the front surface of the display; and a gap portion formed between the front surface of the display and the plate-like body and configured to switch between a state filled with a fluid and a state where the fluid is discharged.

In the display apparatus according to the first embodiment of the present technology, a gap between the front surface of the display and the plate-like body transmitting the image light is switched between the state filled with a fluid and the state where the fluid is discharged.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present technology will be described with reference to the drawings.

One Embodiment of Display Apparatus to which Present Technology is Applied

Figure 1:
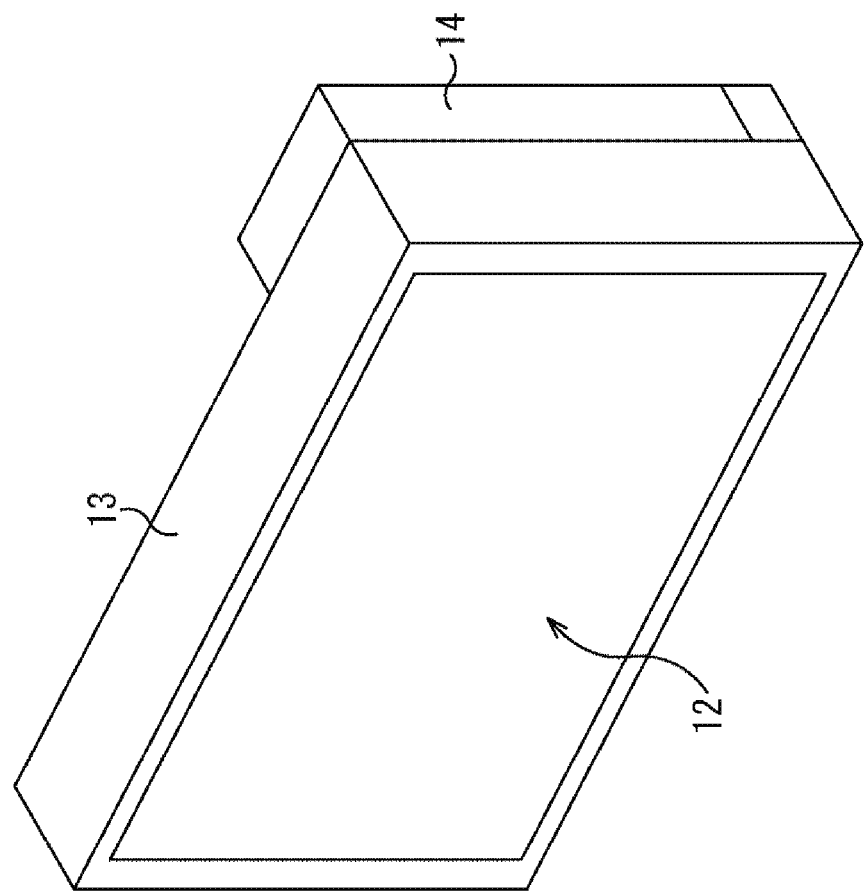
FIG. 1 is a perspective view showing an appearance example of an embodiment of a display apparatus.

FIG. 1 is a perspective view showing an appearance example of an embodiment of a display apparatus to which the present technology is applied.

A display apparatus 11 of FIG. 1 is, for example, a display apparatus in a television receiver for displaying a video (image) of a television broadcast. The display apparatus 11 includes a display panel 12, a frame 13, and a reservoir tank 14.

The display panel 12 is a portion for displaying an image, and the peripheral edge of the display panel 12 is surrounded by a rectangular frame 13 such that the display panel 12 is supported by the frame 13. The reservoir tank 14 is installed on the back surface of the frame 13. The reservoir tank 14 will be described later.

First Configuration Example of Display Panel 12

Figure 2:
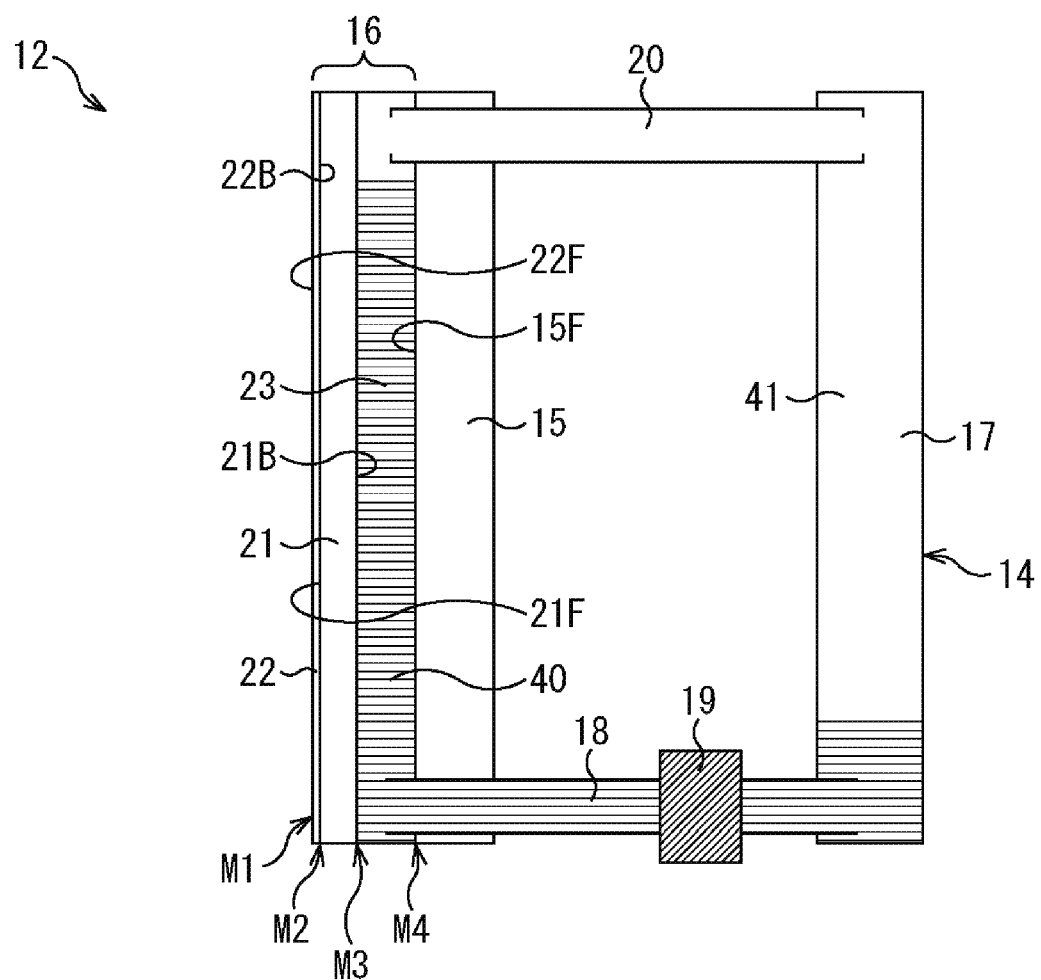
FIG. 2 is a vertical cross-sectional view showing a first configuration example of a display panel.

FIG. 2 is a vertical cross-sectional view showing a first configuration example of the display panel 12. Note that in this specification, the vertical cross-sectional view of the display panel 12 shows a cross-section obtained by cutting the display panel 12 in a vertical direction by a plane perpendicular to the screen of the display panel 12. Additionally, in this specification, a direction in which light of an image (image light) displayed on the display panel 12 is emitted to a viewer is assumed as a front side of the display panel 12 (front surface side), and a direction opposite to the front side is assumed as a rear side of the display panel 12 (back surface side).

Figure 3:
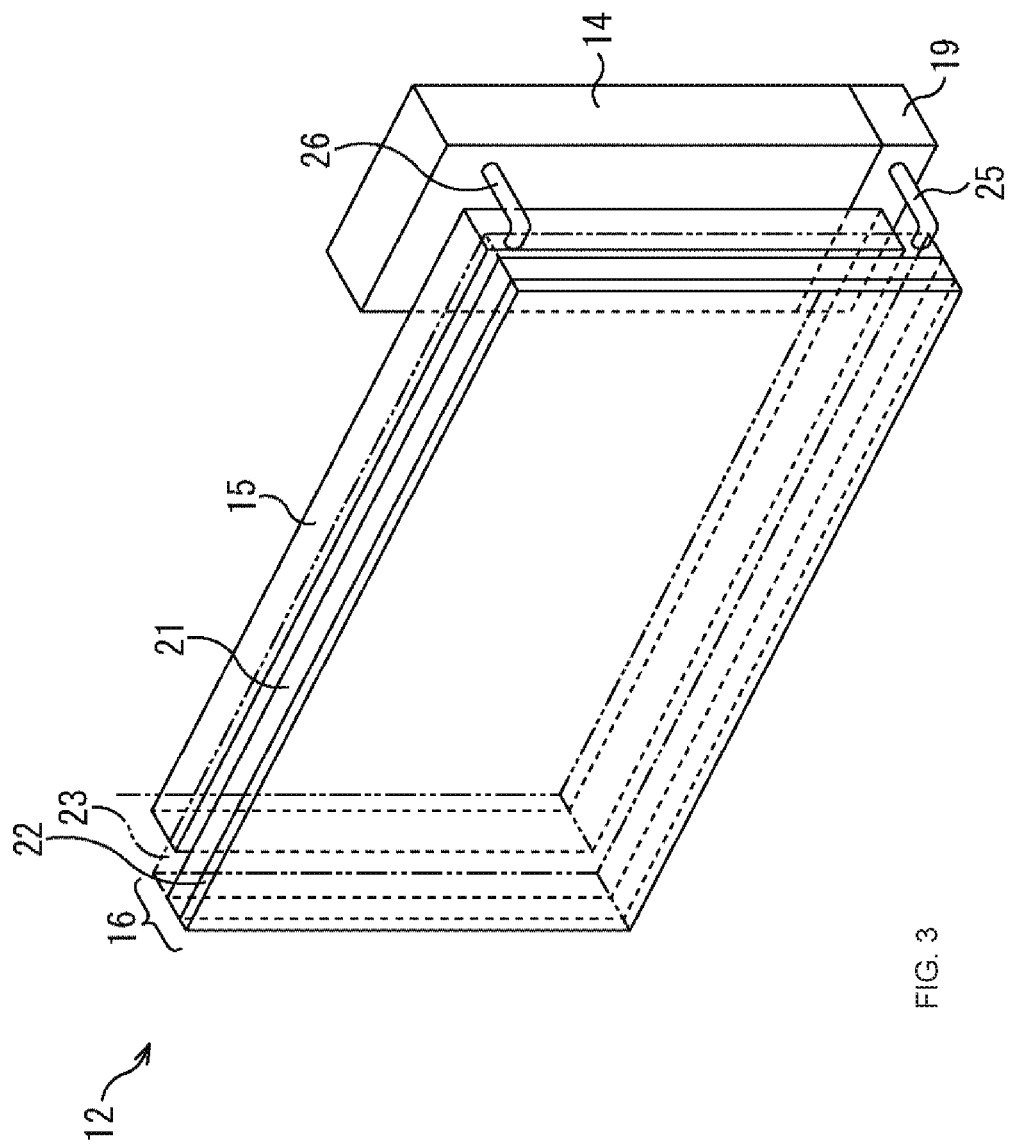
FIG. 3 is a perspective view showing the first configuration example of the display panel inside a frame of the display apparatus.
Figure 4:
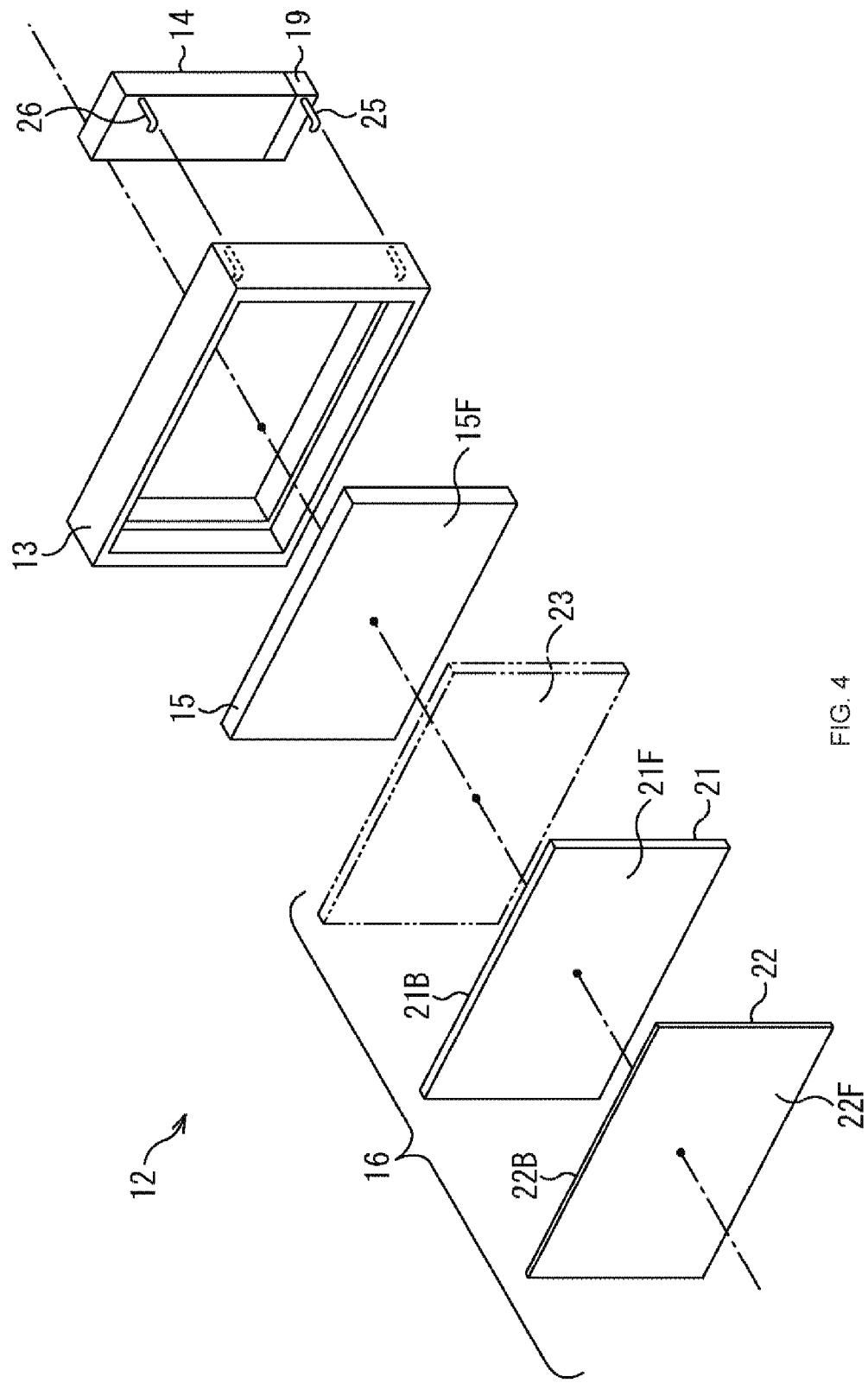
FIG. 4 is an exploded perspective view of the display apparatus using the first configuration example of the display panel.

Additionally, FIG. 3 is a perspective view showing a first configuration example of the display panel 12 inside the frame 13 of the display apparatus 11. FIG. 4 is an exploded perspective view of the display apparatus 11 using the first configuration example of the display panel 12. The configuration example of the display panel 12 shown in FIG. 2 will be described with reference to FIGS. 3 and 4.

In FIG. 2, the structure of the display panel 12 is simplified. The display panel 12 includes a display 15, a transmission/reflection switching unit 16, a reservoir 17, a first supply/discharge passage 18, a pump 19, and a second supply/discharge passage 20.

The display 15 is a well-known display panel in which a detailed configuration is omitted. For example, the display 15 is a liquid crystal display panel and includes a liquid crystal layer, a polarizing plate, a color filter, a glass substrate, a transparent electrode, a backlight, and the like. Note that the display 15 may be any type of display panel such as an organic electro-luminescence (EL) display panel, a plasma display panel, or a field emission display (FED) panel.

The transmission/reflection switching unit 16 is provided on the front side of the display 15 (see FIGS. 3 and 4). The transmission/reflection switching unit 16 is switched between a transmissive state and a reflective state. The transmissive state is a state of transmitting image light from the image displayed on the display 15 and of suppressing the reflection of external light incident from the front side of the display panel 12. The reflective state is a state of increasing the reflection of the external light incident from the front side of the display panel 12 more than the reflection in the transmissive state.

The transmission/reflection switching unit 16 includes a plate-like body 21, an anti-reflection layer 22, and a gap portion 23, as shown in FIGS. 3 and 4.

The plate-like body 21 is provided such that the gap portion 23 having a thickness of about 1 mm to about 2 mm or the like is formed along a front surface 15F of the display 15. The plate-like body 21 is formed in a rectangular shape slightly larger than the front surface 15F of the display 15, and has a thickness of about 1 mm to about 2 mm or the like. Additionally, the plate-like body 21 is molded using, for example, an acrylic resin, and has a characteristic of transmitting at least visible light.

The peripheral edge of the plate-like body 21 is fixed to the inner peripheral portion of the frame 13 shown in FIGS. 1 and 4 and is integrally fixed to the display 15 via the frame 13.

The anti-reflection layer 22 is, for example, an anti-reflection film bonded to the entire front surface 21F of the plate-like body 21, and suppresses the reflection of light incident from a front surface 22F of the anti-reflection layer 22. As the anti-reflection film, for example, a product name "DSG-17V1" manufactured by Dai Nippon Printing Co., Ltd. may be employed.

The gap portion 23 is provided between the front surface 15F of the display 15 and a back surface 21B of the plate-like body 21. In other words, the gap portion 23 is a gap between the front surface 15F of the display 15 and the back surface 21B of the plate-like body 21 and is also a space surrounded by the frame 13 at the peripheral edge thereof.

The gap portion 23 is filled with liquid 40 and gas 41, which are transparent with respect to at least visible light, in a switching manner. The liquid 40 is liquid having a high refractive index, which has a refractive index higher than the refractive index of at least the gas 41 and a smaller difference in refractive index than that of the gas 41 with respect to the refractive index of the plate-like body 21. For example, in a case where the plate-like body 21 is formed of an acrylic resin having a refractive index of about 1.5, liquid paraffin (mineral oil) having a refractive index of about 1.5 may be used as the liquid 40.

The gas 41 is, for example, air having a refractive index of about 1.0. However, the gas 41 may be any gas other than air as long as the gas has a larger difference in refractive index than that of the liquid 40 with respect to the refractive index of the plate-like body 21. Additionally, liquid having a larger difference in refractive index than that of the liquid 40 with respect to the refractive index of the plate-like body 21 may be used instead of the gas 41. In other words, a fluid other than air may be used as the gas 41 having a relationship in which the difference in refractive index between the plate-like body 21 and the liquid 40 is smaller than the difference in refractive index between the plate-like body 21 and the gas 41, or may be used instead of the gas 41. Furthermore, instead of filling the gap portion 23 with the gas 41, the gap portion 23 may be evacuated.

In other words, the gap portion 23 may be filled by switching between two types of fluids having different refractive indices, i.e., a fluid having a low refractive index and a fluid having a high refractive index, or may be switched between a case where the gap portion 23 is filled with one type of fluid having a different refractive index from that in vacuum and a case where that fluid is discharged from the gap portion 23 and the gap portion 23 becomes vacuum.

Additionally, the display panel 12 includes the reservoir 17, the first supply/discharge passage 18, the pump 19, and the second supply/discharge passage 20, which serve as a supply/discharge unit for switching between the liquid 40 and the gas 41 to be filled in the gap 23.

The reservoir 17 is a space portion in the reservoir tank 14 shown in FIGS. 1, 3, and 4 and stores the liquid 40 and the gas 41 to be filled in the gap portion 23. The capacity of the reservoir 17 is larger than the capacity of the gap portion 23.

The first supply/discharge passage 18, the pump 19, and the second supply/discharge passage 20 are provided between the gap portion 23 and the reservoir 17.

The first supply/discharge passage 18 is a conduit formed of a pipe member 25 such as a tube or a pipe shown in FIGS. 3 and 4. One end of the first supply/discharge passage 18 communicates with the vicinity of the lower end of the gap portion 23, and the other end of the first supply/discharge passage 18 communicates with the vicinity of the lower end of the reservoir 17. The first supply/discharge passage 18 is used as a conduit for supplying the liquid 40 from the reservoir 17 to the gap portion 23 and used as a conduit for discharging the liquid 40 from the gap portion 23 to the reservoir 17.

As shown in FIGS. 3 and 4, the pump 19 is provided, for example, at the lower end of the reservoir tank 14 and to the first supply/discharge passage 18. The pump 19 is a bidirectional pump capable of switching a liquid feed direction between both directions, i.e., a direction from the reservoir 17 to the gap portion 23 and a direction from the gap portion 23 to the reservoir 17.

The second supply/discharge passage 20 is a conduit formed of a pipe member 26 such as a tube or a pipe shown in FIGS. 3 and 4. One end of the second supply/discharge passage 20 communicates with the vicinity of the upper end of the gap portion 23, and the other end of the second supply/discharge passage 20 communicates with the vicinity of the upper end of the reservoir 17. The second supply/discharge passage 20 is used as a conduit for supplying the gas 41 from the reservoir 17 to the gap portion 23 and used as a conduit for discharging the gas 41 from the gap portion 23 to the reservoir 17.

Action of Transmission/Reflection Switching Unit 16

Figure 5:
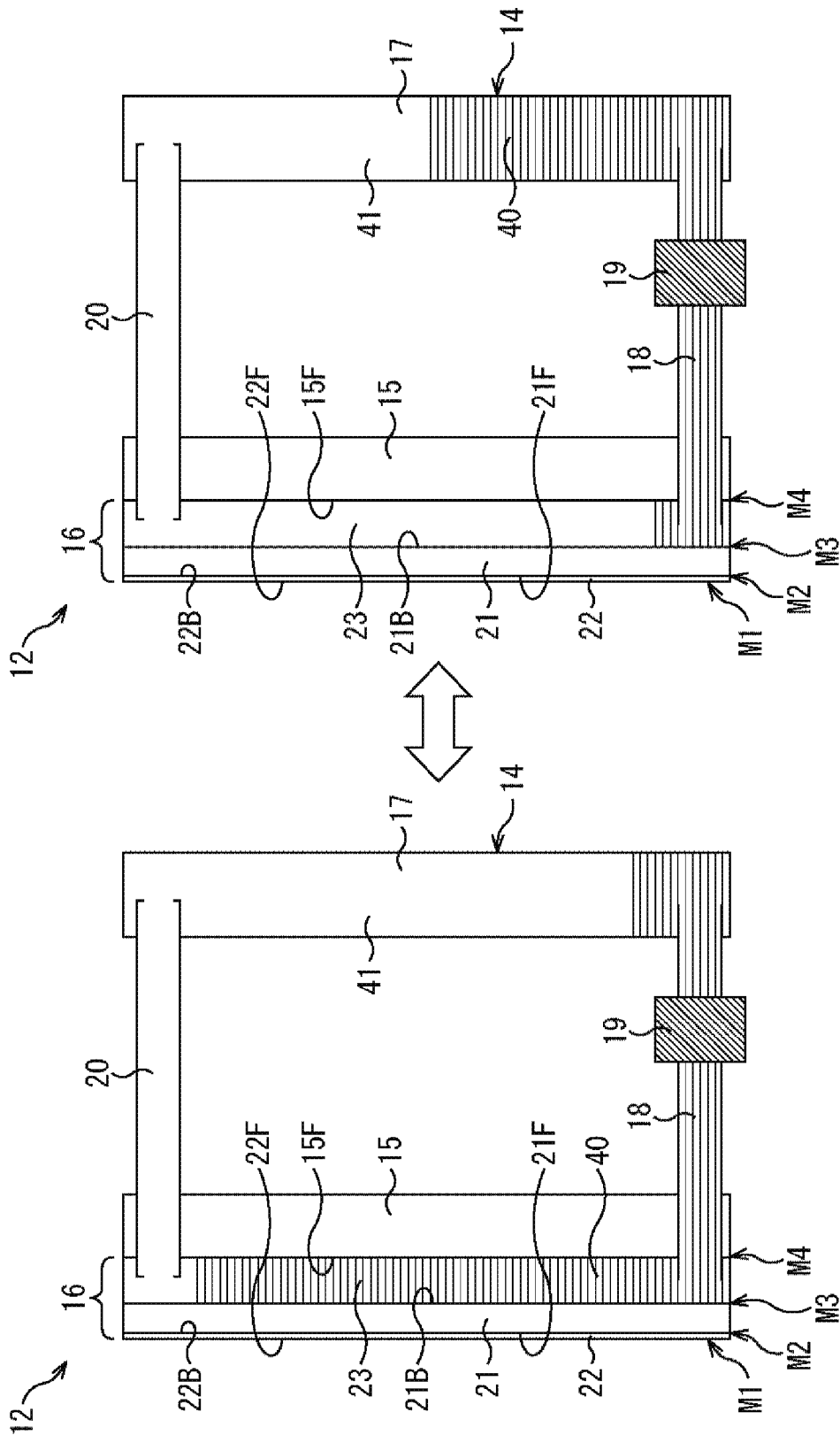
FIGS. 5A and 5B are diagrams for describing the action of a transmission/reflection switching unit.

Subsequently, the action of the transmission/reflection switching unit 16 will be described with reference to FIGS. 5A and 5B. FIG. 5A shows a state of the display panel 12 where the liquid 40 is filled in the gap portion 23 and the transmission/reflection switching unit 16 is set in the transmissive state, and FIG. 5B shows a state of the display panel 12 where the gas 41 is filled in the gap portion 23 and the transmission/reflection switching unit 16 is set in the reflective state.

In a case where a viewer views a video (image) displayed on the display panel 12, the transmission/reflection switching unit 16 is set in the transmissive state shown in FIG. 5A. In other words, the pump 19 operates to supply the liquid 40 from the reservoir 17 to the gap portion 23 through the first supply/discharge passage 18. At that time, the liquid 40 is stored from the lower side of the gap portion 23, and the liquid level gradually rises. Additionally, a difference in air pressure of the gas 41 is generated in the gap portion 23 and the reservoir 17 due to the movement of the liquid 40 from the reservoir 17 to the gap portion 23, and the gas 41 in the gap portion 23 is discharged to the reservoir 17 through the second supply/discharge passage 20. When the liquid 40 is stored in substantially the entire gap portion 23 as shown in FIG. 5A, the pump 19 stops.

Note that if the liquid 40 is stored in the gap portion 23 up to a height that exceeds the upper end of the screen of the display 15, on which the image is displayed, to some extent, there is no difference in effect from the state where the liquid 40 is completely stored up to the upper end of the gap portion 23. Hereinafter, the case where the gap portion 23 is filled with the liquid 40 also includes a case where the liquid 40 is stored in the gap portion 23 to enter a state equivalent in effect to the state where the liquid 40 is completely stored up to the upper end of the gap portion 23.

In a case where the transmission/reflection switching unit 16 is set in the transmissive state shown in FIG. 5A, the image light from the image displayed on the display panel 12 is emitted from the front surface 15F of the display 15, transmitted through the gap portion 23, the plate-like body 21, and the anti-reflection layer 22 in the stated order, and then emitted forward from the front surface 22F of the anti-reflection layer 22 (front surface of display panel 12).

Here, since the refractive index of the liquid 40 is close to the refractive index of the plate-like body 21 and the refractive index of an optical material forming the front surface 15F of the display 15, the attenuation of the image light due to reflection on a boundary surface M4 (front surface 15F of display 15) between the display 15 and the gap portion 23 and a boundary surface M3 (back surface 21B of plate-like body 21) between the plate-like body 21 and the gap portion 23 is small. Additionally, because of the nature of the anti-reflection layer 22, the attenuation of the image light due to reflection on a boundary surface M1 (front surface 22F of anti-reflection layer 22, i.e., front surface of display panel 12) between the anti-reflection layer 22 and the external air on the front side of the anti-reflection layer 22, and a boundary surface M2 (front surface 21F of plate-like body 21, and back surface 22B of anti-reflection layer 22) between the plate-like body 21 and the anti-reflection layer 22 is also small.

Therefore, in a case where the viewer views the image displayed on the display 15, the front surface 15F side of the display 15 is not substantially affected by provision of the transmission/reflection switching unit 16.

Additionally, the external light incident on the display panel 12 from the front surface side of the display panel 12 is transmitted through the anti-reflection layer 22, the plate-like body 21, and the gap portion 23 in the stated order to enter the display 15. At that time, the reflection of the external light is small in any of the boundary surfaces M1 to M4, and the external light incident on the display panel 12 is not substantially reflected.

Therefore, in a case where the viewer views the image displayed on the display 15, no influence of the external light substantially occurs.

The transmission/reflection switching unit 16 is set in the transmissive state as described above, and thus the display panel 12 enters a state suitable for the case where the viewer views the image of the display 15. Hereinafter, the state of the display panel 12 when the transmission/reflection switching unit 16 is set in the transmissive state is referred to as an image display state.

Meanwhile, in a case where the display panel 12 is not used, for example, when a user operation is performed so as to turn off the television receiver (stop viewing), the transmission/reflection switching unit 16 is set in the reflective state shown in FIG. 5B. In other words, the pump 19 operates to discharge the liquid 40 from the gap portion 23 to the reservoir 17 through the first supply/discharge passage 18. At that time, the liquid level of the liquid 40 in the gap portion 23 gradually lowers. Additionally, the gas 41 of the reservoir 17 is supplied from the reservoir 17 to the gap portion 23 through the second supply/discharge passage 20 due to the movement of the liquid 40 from the gap portion 23 to the reservoir 17. When the gas 41 is filled in substantially the entire gap portion 23 as shown in FIG. 5B, that is, when the liquid 40 is discharged from substantially the entire gap portion 23, the pump 19 stops.

Note that if the liquid 40 is slightly left at the lower end of the gap portion 23, there is no difference in effect from the state where the liquid 40 is completely discharged up to the lower end of the gap portion 23. Hereinafter, the case where the gap portion 23 is filled with the gas 41 also includes a state substantially equivalent in effect to the state where the liquid 40 is completely discharged up to the lower end of the gap portion 23.

In a case where the transmission/reflection switching unit 16 is set in the reflective state shown in FIG. 5B, part of the external light incident on the display panel 12 from the front surface side of the display panel 12 is transmitted through the anti-reflection layer 22, the plate-like body 21, and the gap portion 23 in the stated order to enter the display 15.

Here, as compared with the refractive index of the liquid 40, the refractive index of the gas 41 has a larger difference with the refractive index of the plate-like body 21 and with the refractive index of the optical material forming the front surface 15F of the display 15. For that reason, as compared with the transmissive state of the transmission/reflection switching unit 16, the reflection of the external light in the reflective state increases on the boundary surface M3 and the boundary surface M4.

The external light reflected on the boundary surface M3 is transmitted through the plate-like body 21 and the anti-reflection layer 22 and is emitted from the front surface 22F of the anti-reflection layer 22 without substantially causing attenuation due to the reflection on the boundary surface M2 and the boundary surface M1.

Additionally, the external light reflected on the boundary surface M4 is transmitted through the gap portion 23, the plate-like body 21, and the anti-reflection layer 22 and is emitted from the front surface 22F of the anti-reflection layer 22. The external light reflected on the boundary surface M4 causes attenuation due to the reflection on the boundary surface M3, but does not substantially cause attenuation due to the reflection on the boundary surface M2 and the boundary surface M1.

Therefore, part of the external light incident on the display panel 12 is reflected on the boundary surfaces M3 and M4 and is emitted, as reflected light of the external light, from the front surface of the display panel 12, i.e., the front surface 22F of the anti-reflection layer 22. The reflected light of the external light emitted from the front surface of the display panel 12 is mainly light in which the light reflected on the boundary surface M3 and the boundary surface M4 is mixed, and the screen of the display panel 12 takes a color of the external light. Since white light is external light normally in a room, the screen of the display panel 12 becomes white. Therefore, if the indoor wall has a bright color such as white, the display panel 12 can be particularly fitted into the color of the wall. Note that even if the display panel 12 is not used, the transmission/reflection switching unit 16 may be set in the transmissive state to allow the design property corresponding to a request of a user to be selected.

The transmission/reflection switching unit 16 is set in the reflective state as described above, and thus the display panel 12 enters a state where a high design property is obtained when the display panel 12 is not used. Hereinafter, the state of the display panel 12 when the transmission/reflection switching unit 16 is set in the reflective state is referred to as an inactive state.

Configuration Example of Plate-Like Body 21

Next, a plurality of forms for the back surface 21B of the plate-like body 21 in the transmission/reflection switching unit 16 will be described.

Figure 6:
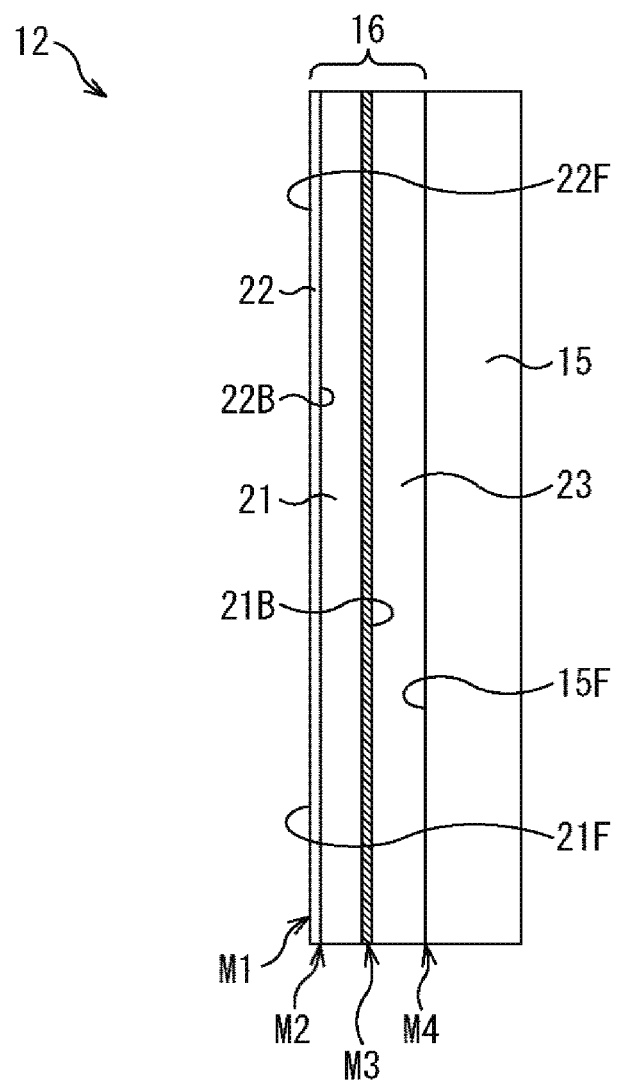
FIG. 6 is a vertical cross-sectional view showing only an optical system of the display panel.

FIG. 6 is a vertical cross-sectional view showing only an optical system of the display panel 12.

In FIG. 6, the back surface 21B of the plate-like body 21 may be a flat surface or an uneven surface having irregularities.

Figure 7:
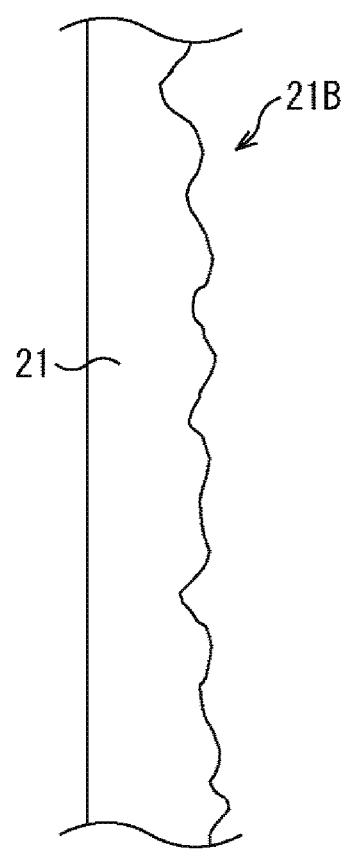
FIG. 7 is a cross-sectional view showing an enlarged back surface in a first form in which a back surface of a plate-like body is an uneven surface.

FIG. 7 is a cross-sectional view showing an enlarged back surface 21B in a first form in which the back surface 21B of the plate-like body 21 is an uneven surface. In FIG. 7, the back surface 21B of the plate-like body 21 has fine irregularities of random shapes and sizes. In a case where the gas 41 is filled in the gap part 23 and the transmission/reflection switching unit 16 is set in the reflective state, when the external light incident on the display panel 12 travels through the plate-like body 21 and enters the back surface 21B (boundary surface M3), part of the external light is reflected on the back surface 21B having fine irregularities. During such reflection, the external light is scattered (diffused) in various directions by fine surfaces of the back surface 21B that face in various directions Therefore, as compared with a case where the back surface 21B is a flat surface, the screen of the display panel 12 when the transmission/reflection switching unit 16 is set in the reflective state has higher scattering property and is whitened.

Meanwhile, in a case where the liquid 40 is filled in the gap portion 23 and the transmission/reflection switching unit 16 is set in the transmissive state, the difference in refractive index between the plate-like body 21 and the liquid 40 is small. Thus, the reflection of the image light and the external light on the back surface 21B of the plate-like body 21 does not occur substantially, and no influence due to the irregularities formed on the back surface 21B substantially occurs.

Figure 8:
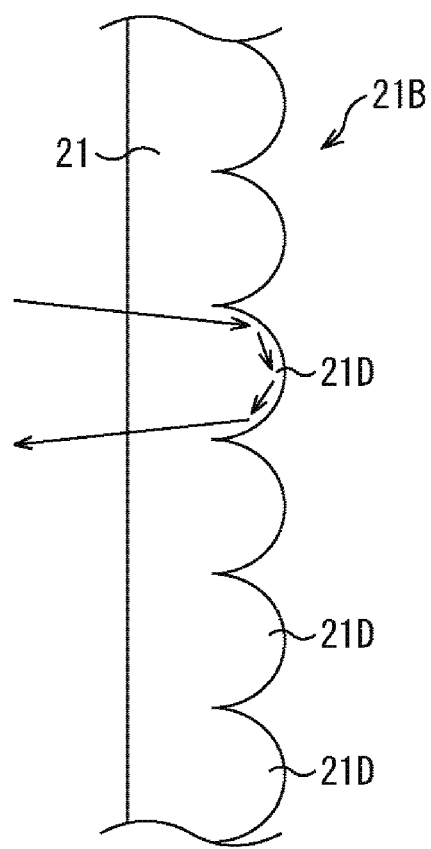
FIG. 8 is a cross-sectional view showing an enlarged back surface in a second form in which the back surface of the plate-like body is an uneven surface.

FIG. 8 is a cross-sectional view showing an enlarged back surface 21B in a second form in which the back surface 21B of the plate-like body 21 is an uneven surface. In FIG. 8, the back surface 21B of the plate-like body 21 has a shape in which a large number of substantially hemispherical protrusions 21D are arranged. In other words, each of the irregularities of the back surface 21B is formed in a hemispherical shape. In a case where the gas 41 is filled in the gap portion 23 and the transmission/reflection switching unit 16 is set in the transmissive state, when the external light incident on the display panel 12 travels through the plate-like body 21 and enters the back surface 21B (boundary surface M3), part of the external light is reflected on the back surface 21B having a large number of hemispherical protrusions 21D. During such reflection, the external light is scattered (diffused) in various directions by the surfaces of the back surface 21B that face in various directions. Additionally, the retroreflection in the incident direction of the external light increases by a plurality of times of reflection in the same protrusion 21D.

Therefore, as compared with the case where the back surface 21B is flat surface, when the transmission/reflection switching unit 16 is set in the reflective state, the scattered reflectance of the screen of the display panel 12 is increased, and the screen is more whitened and also brightened.

Meanwhile, in the case where the liquid 40 is filled in the gap portion 23 and the transmission/reflection switching unit 16 is set in the transmissive state, the difference in refractive index between the plate-like body 21 and the liquid 40 is small. Thus, the reflection of the image light and the external light on the back surface 21B of the plate-like body 21 does not occur substantially, and no influence due to the irregularities formed on the back surface 21B substantially occurs.

Control of Transmission/Reflection Switching Unit 16

Figure 9:
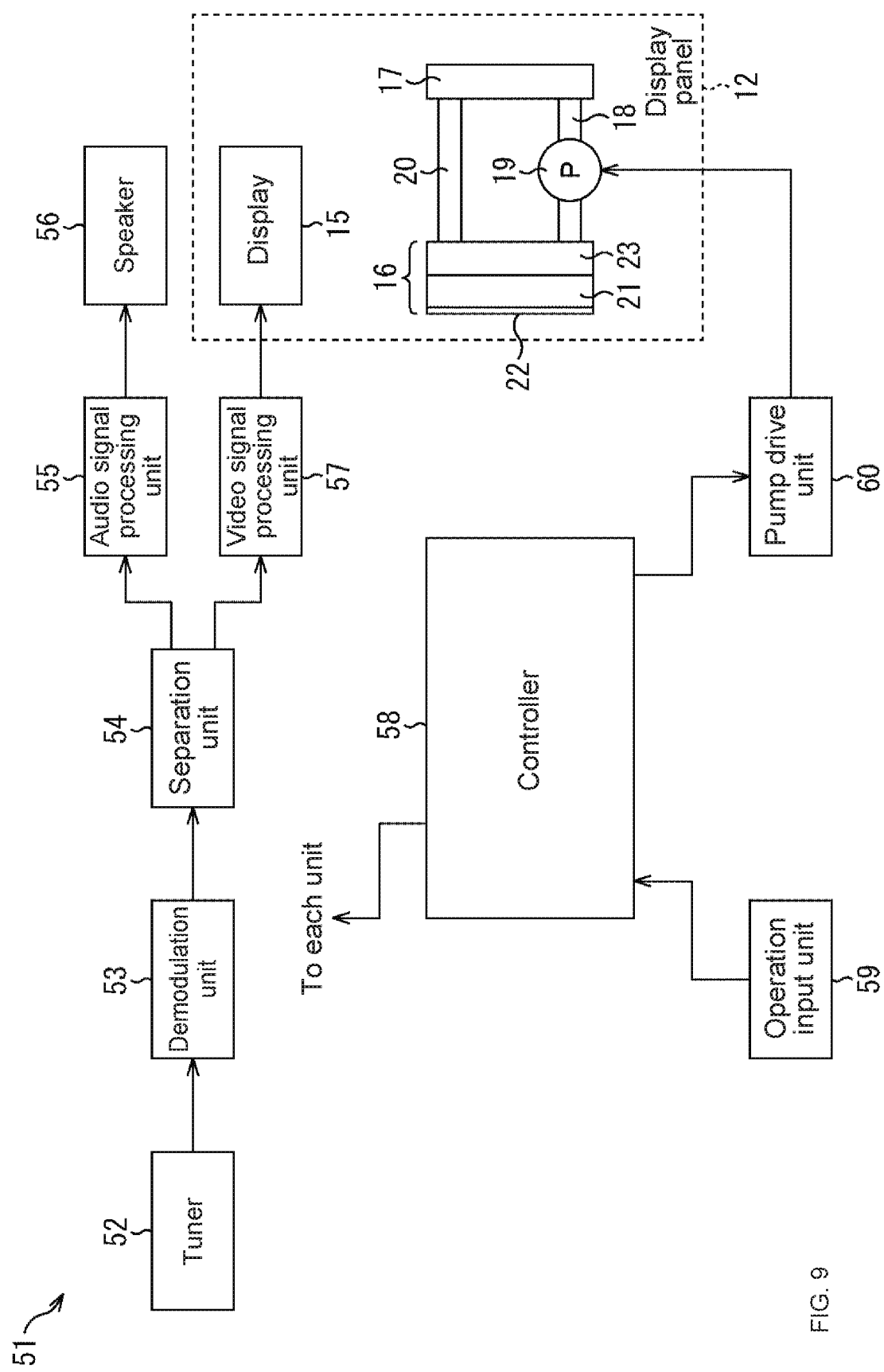
FIG. 9 is a block diagram showing a configuration example of a television receiver using the first configuration example of the display panel.

FIG. 9 is a block diagram showing a configuration example of a television receiver using the first configuration example of the display panel 12.

In FIG. 9, a television receiver 51 includes a display panel 12, a tuner 52, a demodulation unit 53, a separation unit 54, an audio signal processing unit 55, a speaker 56, a video signal processing unit 57, a controller 58, an operation input unit 59, and a pump drive unit 60.

The tuner 52 acquires multiplexed data including video data and audio data of a TV broadcast via an antenna, a cable, or the like (not shown), and supplies the multiplexed data to the demodulation unit 53.

The demodulation unit 53 demodulates the multiplexed data from the tuner 52 and supplies the resultant data to the separation unit 54.

The separation unit 54 separates the demodulated multiplexed data from the demodulation unit 53 into video data and audio data, supplies the audio data to the audio signal processing unit 55, and supplies the video data to the video signal processing unit 57.

The audio signal processing unit 55 decodes the audio data from the separation unit 54 and supplies a decoded audio signal to the speaker 56.

The speaker 56 outputs the audio signal from the audio signal processing unit 55 as a sound wave.

The video signal processing unit 57 decodes the video data from the separation unit 54 and supplies a decoded video signal to the display 15 of the display panel 12. The display 15 displays the video signal from the video signal processing unit 57 as a video (image).

The control unit 58 integrally controls each unit.

The operation input unit 59 acquires a user operation from a remote commander or the like (not shown), and supplies an operation signal corresponding to the user operation to the controller 58.

The pump drive unit 60 drives the pump 19 on the basis of an instruction from the controller 58 such as the start or stop of the operation and the switching of the liquid feed direction in the pump 19 shown in FIG. 2.

Additionally, FIG. 9 shows, as components of the display panel 12, the display 15, the reservoir 17, the plate-like body 21, the anti-reflection layer 22, and the gap portion 23 of the transmission/reflection switching unit 16, the first supply/discharge passage 18, the pump 19, and the second supply/discharge passage 20 shown in FIG. 2 or the like, though description thereof is omitted.

Processing Procedure Related to Control of Transmission/reflection Switching Unit 16

Figure 10:
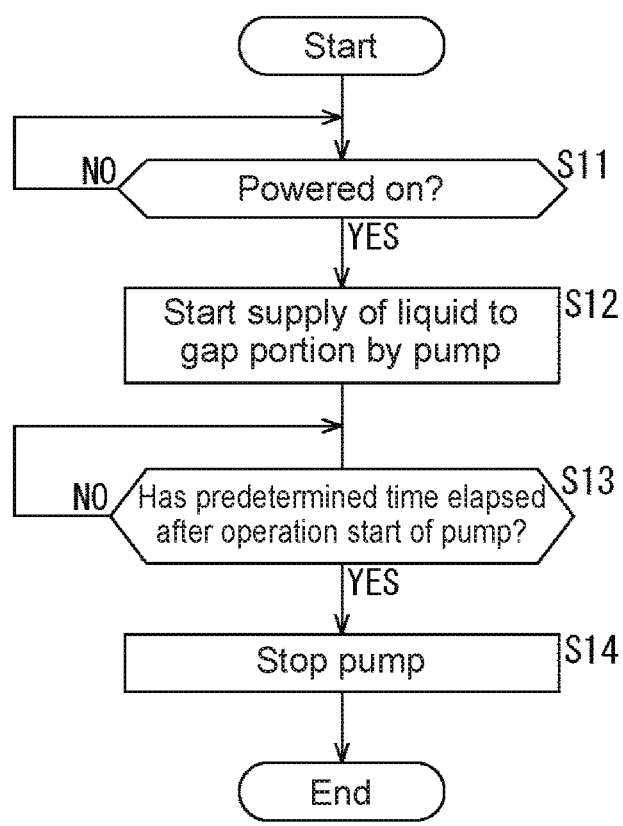
FIG. 10 is a flowchart for describing an example of processing related to the transmission/reflection switching unit that is performed by a controller.

FIG. 10 is a flowchart for describing an example of processing related to the transmission/reflection switching unit 16 that is performed by the controller 58, showing an example of processing when the transmission/reflection switching unit 16 is set in the transmissive state and the display panel 12 is set in the image display state.

In Step S11, the controller 58 determines whether or not a user operation for turning on the television receiver 51 has been performed on the basis of an operation signal from the operation input unit 59.

If it is determined in Step S11 that a user operation of turning on the television receiver 51 has not been performed, the processing repeats Step S11.

Meanwhile, if it is determined in Step S11 that a user operation of turning on the television receiver 51 has been performed, the processing proceeds from Step S11 to Step S12.

In Step S12, the controller 58 instructs the pump drive unit 60 to start the operation of the pump 19 with the liquid feed direction of the pump 19 as a direction from the reservoir 17 to the gap portion 23. Thus, the pump 19 is activated, and the supply of the liquid 40 to the gap portion 23 is started. The processing proceeds from Step S12 to Step S13.

In Step S13, the controller 58 determines whether or not a predetermined time has elapsed after the start of the operation of the pump 19. Specifically, the controller 58 determines whether or not the elapsed time after the start of the operation of the pump 19 has reached a predetermined determination time. The determination time is set to a time necessary from a state where the gap portion 23 is filled with the gas 41 to a state where the gap portion 23 is filled with the liquid 40.

If it is determined in Step S13 that a predetermined time has not elapsed after the start of the operation of the pump 19, the processing repeats Step S13.

Meanwhile, if it is determined in Step S13 that a predetermined time has elapsed after the start of the operation of the pump 19, the processing proceeds from Step S13 to Step S14.

In Step S14, the controller 58 instructs the pump drive unit 60 to stop the operation of the pump 19.

Through the processing of Steps S11 to S14 described above, when the viewer turns on the television receiver 51 in order to view a television broadcast, the liquid 40 is stored in the gap portion 23, the transmission/reflection switching unit 16 is set in the transmissive state, and the display panel 12 is set in the image display state.

Figure 11:
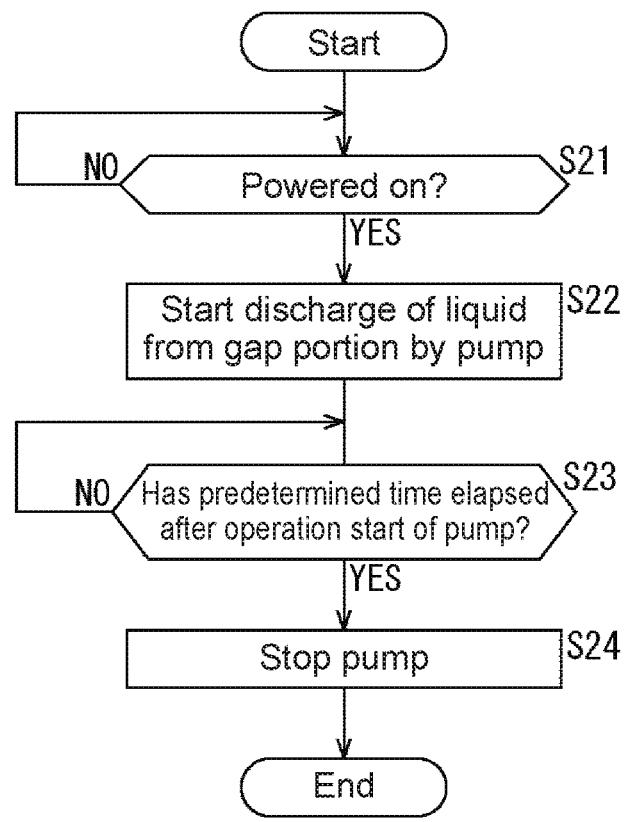
FIG. 11 is a flowchart for describing an example of processing related to the transmission/reflection switching unit that is performed by the controller.

FIG. 11 is a flowchart for describing an example of processing related to the transmission/reflection switching unit 16 that is performed by the controller 58, showing an example of processing when the transmission/reflection switching unit 16 is set in the reflective state and the display panel 12 is set in the inactive state.

In Step S21, the controller 58 determines whether or not a user operation for turning off the television receiver 51 has been performed on the basis of an operation signal from the operation input unit 59.

If it is determined in Step S21 that a user operation of turning off the television receiver 51 has not been performed, the processing repeats Step S21.

Meanwhile, if it is determined in Step S21 that a user operation of turning off the television receiver 51 has been performed, the processing proceeds from Step S21 to Step S22.

In Step S22, the controller 58 instructs the pump drive unit 60 to start the operation of the pump 19 with the liquid feed direction of the pump 19 as a direction from the gap portion 23 to the reservoir 17. Thus, the pump 19 is activated, and the discharge of the liquid 40 from the gap portion 23, i.e., the supply of the gas 41 to the gap portion 23 is started. The processing proceeds from Step S22 to Step S23.

In Step S23, the controller 58 determines whether or not a predetermined time has elapsed after the start of the operation of the pump 19. Specifically, the controller 58 determines whether or not the elapsed time after the start of the operation of the pump 19 has reached a predetermined determination time. The determination time is a time necessary from a state where the gap portion 23 is filled with the liquid 40 to a state where the gap portion 23 is filled with the gas 41.

If it is determined in Step S23 that a predetermined time has not elapsed after the start of the operation of the pump 19, the processing repeats Step S23.

Meanwhile, if it is determined in Step S23 that a predetermined time has elapsed after the start of the operation of the pump 19, the processing proceeds from Step S23 to Step S24.

In Step S24, the controller 58 instructs the pump drive unit 60 to stop the operation of the pump 19.

Through the processing of Steps S21 to S24 described above, when the viewer performs an operation of turning off the television receiver 51 in order to stop viewing a television broadcast, the liquid 40 is discharged from the gap portion 23, and the gap portion 23 is filled with the gas 41. Thus, the transmission/reflection switching unit 16 is set in the reflective state, and the display panel 12 is set in the inactive state.

Note that the processing of the controller 58 described in FIGS. 10 and 11 above is processing in a case where the switching of the transmission/reflection switching unit 16 to the transmissive state or the reflective state is interlocked with the operation of turning on or off the television receiver 51, but the setting the transmission/reflection switching unit 16 in the transmissive state or the reflective state may be performed regardless of the operation of turning on or off the television receiver 51.

According to the first configuration example of the display panel 12 described above, it is possible to switch the reflection characteristics of the display panel 12 by switching between the transmissive state and the reflective state of the transmission/reflection switching unit 16 having a simple structure. The transmission/reflection switching unit 16 is set in the reflective state in a state where an image is not displayed when the display panel 12 is turned off, for example, and thus the reflection characteristics of the display panel 12 can be changed to a characteristic close to white or substantially white, which can provide a form in which the display panel is housed in a glass door having high reflection. Thus, the display apparatus can be fitted into the interior without being conspicuous in the room in which the display apparatus is installed, and the design property corresponding to a request of the user can be improved. Additionally, in the state of displaying an image on the display panel 12, the deterioration of the image can be prevented by setting the transmission/reflection switching unit 16 in the transmissive state.

Second Configuration Example of Display Panel 12

Figure 12:
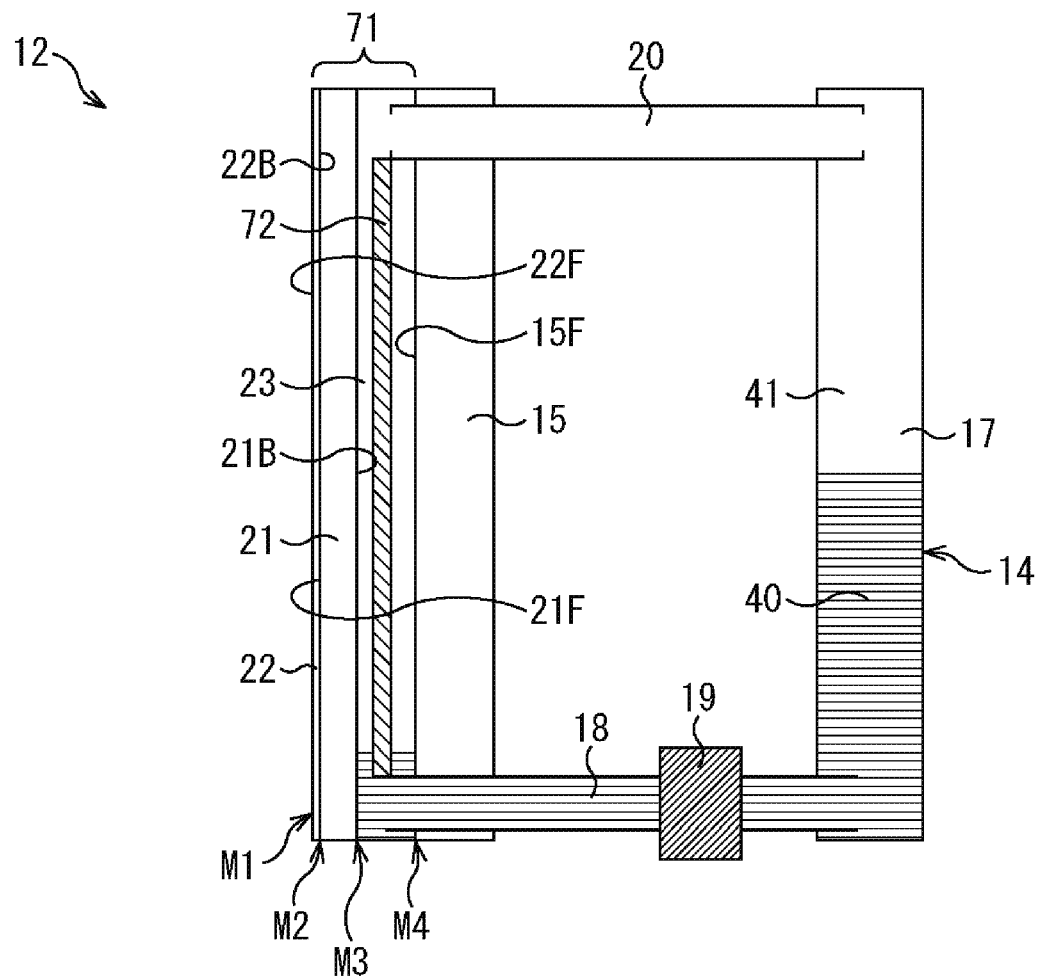
FIG. 12 is a vertical cross-sectional view showing a second configuration example of the display panel.
Figure 13:
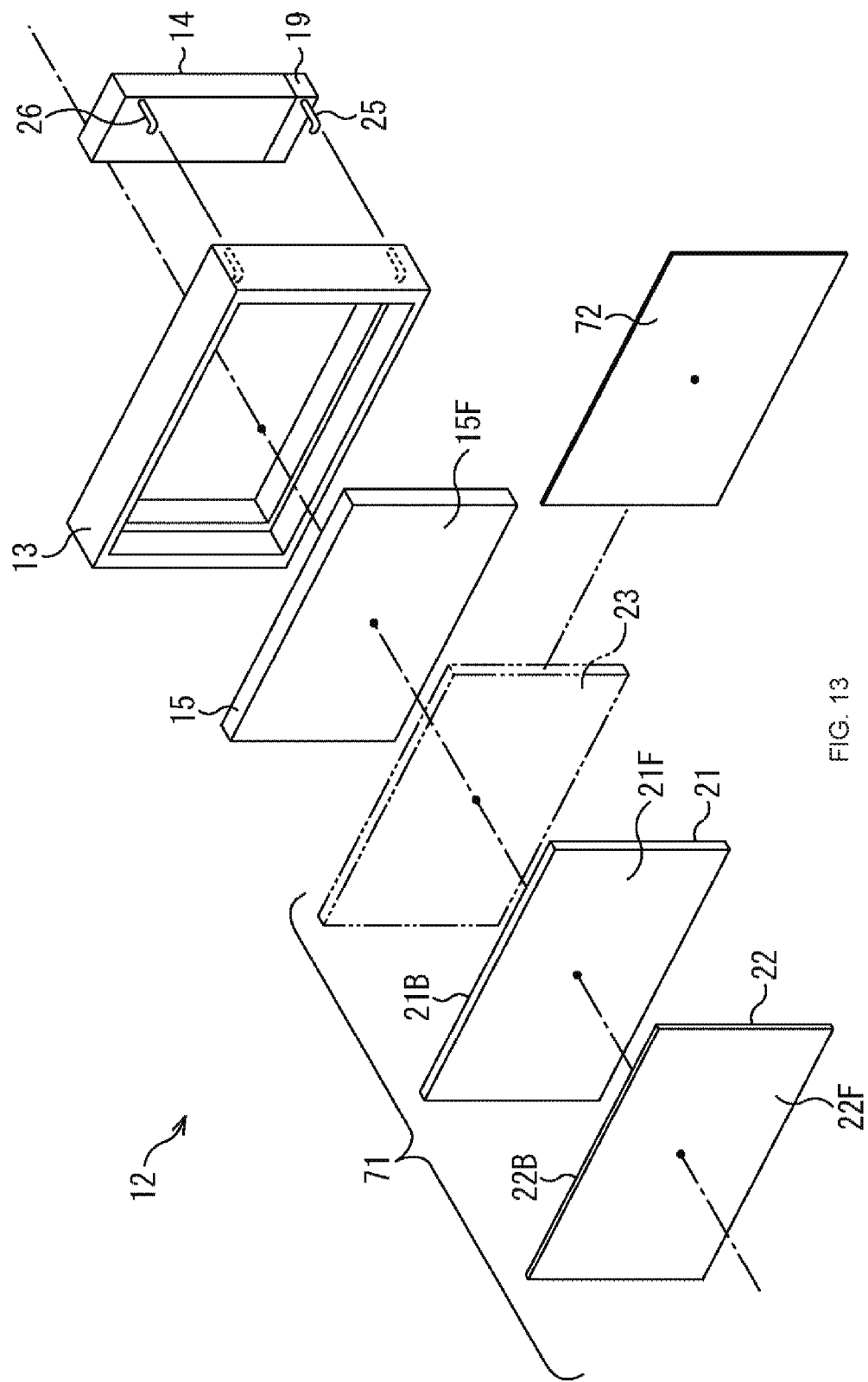
FIG. 13 is an exploded perspective view of the display apparatus using the second configuration example of the display panel.

FIG. 12 is a vertical cross-sectional view showing a second configuration example of the display panel 12. FIG. 13 is an exploded perspective view of the display apparatus 11 using the second configuration example of the display panel 12.

Note that in the figures, portions corresponding to those of the display panel 12 shown in FIGS. 2 and 4 are denoted by the same reference numerals, and description thereof will be omitted as appropriate.

The display panel 12 of FIGS. 12 and 13 includes a display 15, a reservoir 17, a first supply/discharge passage 18, a pump 19, a second supply/discharge passage 20, and a transmission/reflection switching unit 71. Thus, the display panel 12 of FIGS. 12 and 13 is common to the case of FIGS. 2 and 4 in that the display 15, the reservoir 17, the first supply/discharge passage 18, the pump 19, and the second supply/discharge passage 20 are provided. However, the display panel 12 of FIGS. 12 and 13 is different from the case of FIGS. 2 and 4 in that the transmission/reflection switching unit 71 is provided instead of the transmission/reflection switching unit 16 of FIGS. 2 and 4.

The transmission/reflection switching unit 71 shown in FIGS. 12 and 13 includes a plate-like body 21, an anti-reflection layer 22, a gap portion 23, and a polymer-dispersed liquid crystal plate 72 (polymer-dispersed liquid crystal layer). Thus, the transmission/reflection switching unit 71 of FIGS. 12 and 13 is common to the transmission/reflection switching unit 16 of FIGS. 2 and 4 in that the plate-like body 21, the anti-reflection layer 22, and the gap portion 23 are provided. However, the transmission/reflection switching unit 71 of FIGS. 12 and 13 is different from the transmission/reflection switching unit 16 of FIGS. 2 and 4 in that the polymer-dispersed liquid crystal plate 72 is newly provided.

The polymer-dispersed liquid crystal plate 72 is formed in a flat plate shape and is provided in the gap portion 23 along a front surface 15F of the display 15 and a back surface 21B of the plate-like body 21 such that a gap is formed between the front surface 15F of the display 15 and the back surface 21B of the plate-like body 21.

The polymer-dispersed liquid crystal plate 72 has a structure in which polymer-dispersed liquid crystal is sealed between a pair of transparent electrode films. The polymer-dispersed liquid crystal plate 72 scatters light incident on the polymer-dispersed liquid crystal plate 72 in a state where a driving voltage is not applied to the polymer-dispersed liquid crystal. Meanwhile, the polymer-dispersed liquid crystal plate 72 transmits light incident on the polymer-dispersed liquid crystal plate 72 as it is in a state where a driving voltage is applied to the polymer-dispersed liquid crystal.

Subsequently, the action of the transmission/reflection switching unit 71 will be described.

In a case where the transmission/reflection switching unit 71 is set in the transmissive state and the display panel 12 is set in the image display state, similarly to the transmission/reflection switching unit 16 in FIG. 2, the liquid 40 is filled in the gap portion 23. A driving voltage is applied to the polymer-dispersed liquid crystal plate 72, and the polymer-dispersed liquid crystal plate 72 is set in a state of transmitting light (transmissive state). Thus, similarly to the transmission/reflection switching unit 16 of FIG. 2 in which the polymer-dispersed liquid crystal plate 72 is not provided, the transmission/reflection switching unit 71 enters the transmissive state where the incident light is substantially transmitted. In other words, the image light emitted from the display 15 is transmitted through the gap portion 23 without being affected by the provision of the polymer-dispersed liquid crystal plate 72, further transmitted through the plate-like body 21 and the anti-reflection layer 22 without being substantially reflected thereon similarly to the case of the transmission/reflection switching unit 16 of FIG. 2, and then emitted from the front surface of the display panel 12.

Meanwhile, in a case where the transmission/reflection switching unit 71 is set in the reflective state and the display panel 12 is set in the inactive state, similarly to the transmission/reflection switching unit 16 in FIG. 2, the gas 41 is filled in the gap portion 23. A driving voltage is not applied to the polymer-dispersed liquid crystal plate 72, and the polymer-dispersed liquid crystal plate 72 is set in a state of scattering light (scattered state). Thus, the transmission/reflection switching unit 71 enters a reflective state in which most of the incident light is scattered and reflected. In other words, of the external light incident on the display panel 12, external light that travels through the gap portion 23 and enters the polymer-dispersed liquid crystal plate 72 is scattered on the polymer-dispersed liquid crystal plate 72. Of the scattered external light, light toward the front surface side of the display panel 12 is emitted from the front surface of the display panel 12. As a result, the screen of the display panel 12 in the inactive state becomes bright and close to an external light color (mainly white), as compared with the transmission/reflection switching unit 16 of FIG. 2 in which the polymer-dispersed liquid crystal plate 72 is not provided.

Control of Transmission/Reflection Switching Unit 71

Figure 14:
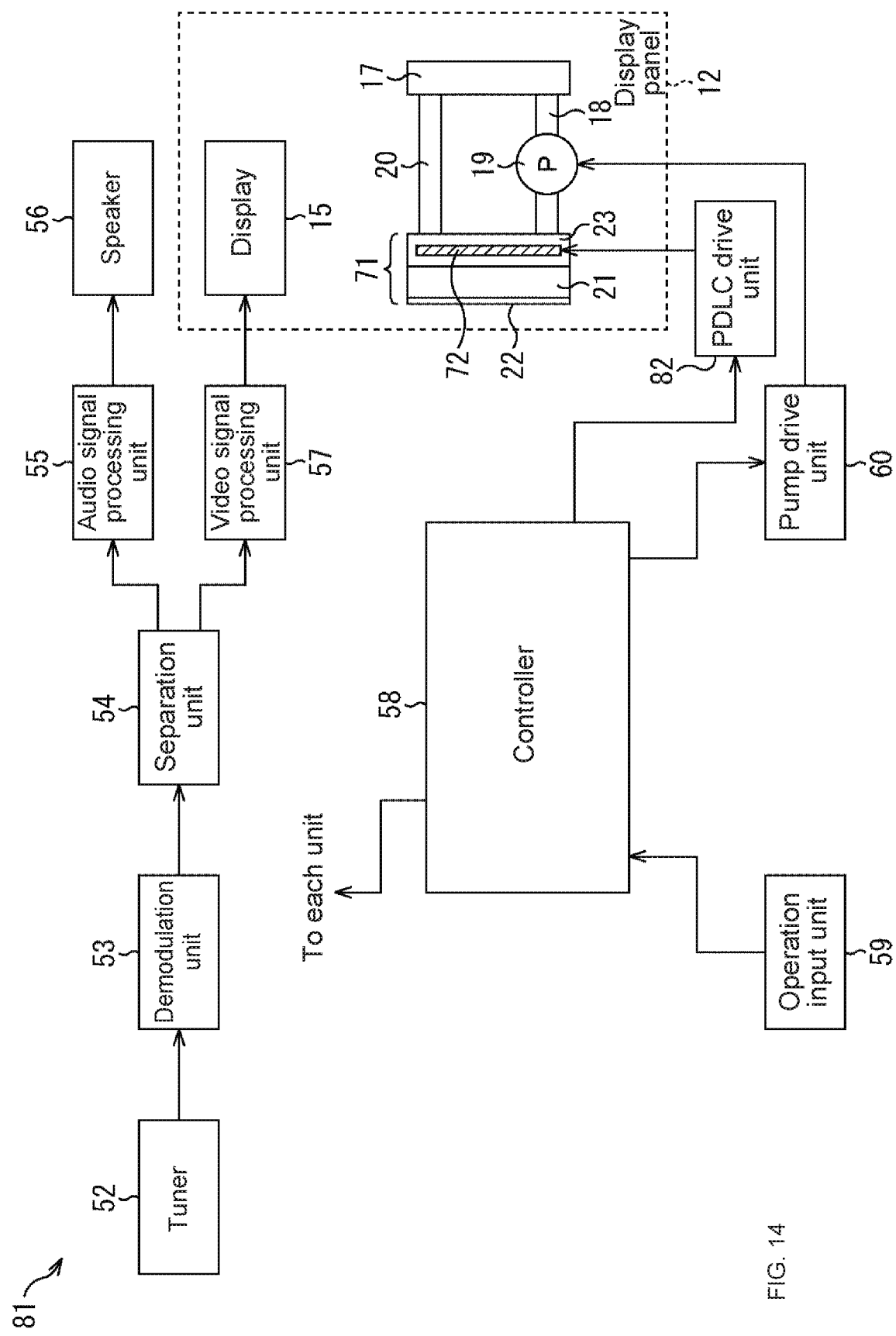
FIG. 14 is a block diagram showing a configuration example of a television receiver using the second configuration example of the display panel.

FIG. 14 is a block diagram showing a configuration example of a television receiver using the second configuration example of the display panel 12 of FIG. 12.

Note that in FIG. 12, portions corresponding to those of the television receiver 51 of FIG. 9 and the display panel 12 of FIG. 12 are denoted by the same reference numerals, and description thereof are omitted as appropriate.

A television receiver 81 of FIG. 14 includes a display panel 12, a tuner 52, a demodulation unit 53, a separation unit 54, an audio signal processing unit 55, a speaker 56, a video signal processing unit 57, a controller 58, an operation input unit 59, a pump drive unit 60, and a polymer-dispersed liquid crystal (PDLC) drive unit 82. Thus, the television receiver 81 of FIG. 14 is common to the case of FIG. 9 in that the display panel 12, the tuner 52, the demodulation unit 53, the separation unit 54, the audio signal processing unit 55, the speaker 56, the video signal processing unit 57, the controller 58, the operation input unit 59, and the pump drive unit 60. However, the television receiver 81 of FIG. 14 is different from the case of FIG. 9 in that the PDLC drive unit 82 is newly provided.

The PDLC drive unit 82 supplies a driving voltage to the polymer-dispersed liquid crystal plate 72 or stops supplying a driving voltage to the polymer-dispersed liquid crystal plate 72 on the basis of an instruction from the controller 58.

Processing Procedure Related to Control of Transmission/Reflection Switching Unit 7

Figure 15:
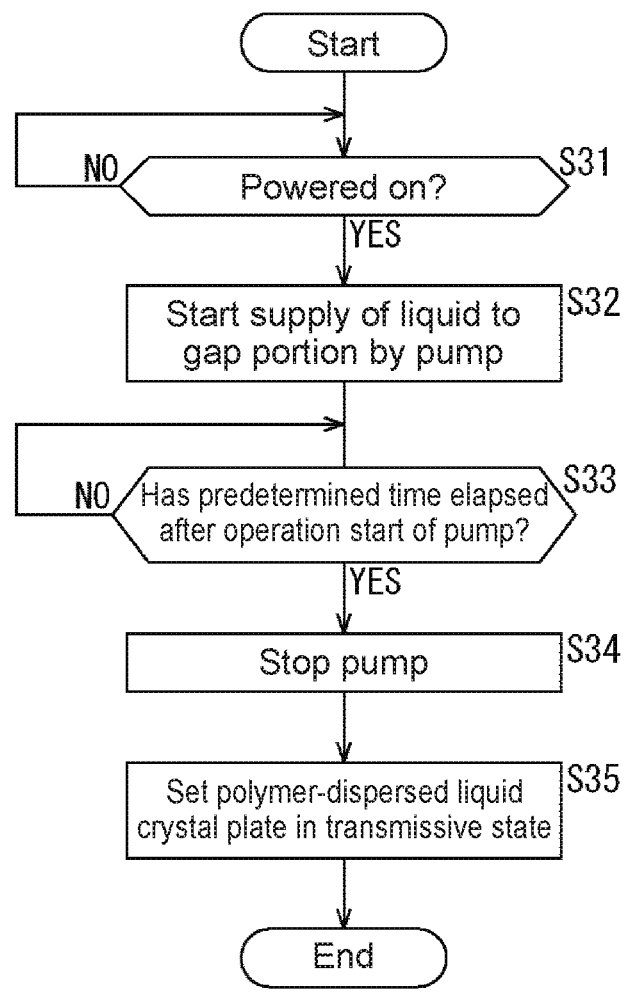
FIG. 15 is a flowchart for describing an example of processing related to a transmission/reflection switching unit in the second configuration example of the display panel, the processing being performed by a controller.

FIG. 15 is a flowchart for describing an example of processing related to the transmission/reflection switching unit 71 that is performed by the controller 58, showing an example of processing when the transmission/reflection switching unit 71 of the display panel 12 is set in the transmissive state and the display panel 12 is set in the image display state.

Note that in FIG. 15, Steps S31 to S34 are the same as Steps S11 to S14 of the flowchart of FIG. 10, and thus description thereof will be omitted.

In Step S35, the controller 58 instructs the PDLC drive unit 82 to supply a driving voltage to the polymer-dispersed liquid crystal plate 72. As a result, the PDLC driving section 82 supplies a driving voltage to the polymer-dispersed liquid crystal plate 72 to set the polymer-dispersed liquid crystal plate 72 in a transmissive state.

Through the processing of Steps S31 to S35, the gap portion 23 of the transmission/reflection switching unit 71 is filled with the liquid 40, and the polymer-dispersed liquid crystal plate 72 enters the transmissive state. Thus, the transmission/reflection switching unit 71 is set in the transmissive state, and the display panel 12 is set in the image display state.

Figure 16:
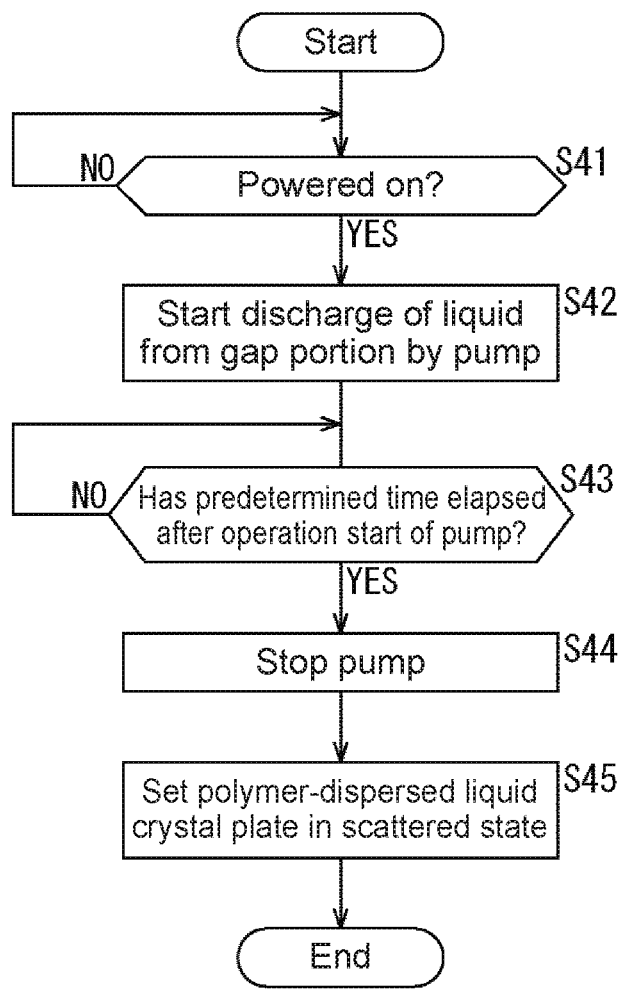
FIG. 16 is a flowchart for describing an example of processing related to the transmission/reflection switching unit in the second configuration example of the display panel, the processing being performed by a controller.

FIG. 16 is a flowchart for describing an example of processing related to the transmission/reflection switching unit 71 that is performed by the controller 58, showing an example of processing when the transmission/reflection switching unit 71 of the display panel 12 is set in the reflective state and the display panel 12 is set in the inactive state. Note that in FIG. 16, Steps S41 to S44 are the same as Steps S21 to S24 of the flowchart of FIG. 11, and thus description thereof will be omitted.

In Step S45, the controller 58 instructs the PDLC drive unit 82 to stop supplying a driving voltage to the polymer-dispersed liquid crystal plate 72. Thus, the PDLC drive unit 82 stops supplying the driving voltage to the polymer-dispersed liquid crystal plate 72, and sets the polymer-dispersed liquid crystal plate 72 in the scattered state.

Through the processing of Steps S41 to S45, the gap portion 23 of the transmission/reflection switching unit 71 is filled with the gas 41, and the polymer-dispersed liquid crystal plate 72 enters the scattered state. Thus, the transmission/reflection switching unit 71 is set in the reflective state, and the display panel 12 is set in the inactive state.

Note that in the second configuration example of the display panel 12, the gap portion 23 may be set in a state being constantly filled with the gas 41 or a state being constantly filled with the liquid 40, the polymer-dispersed liquid crystal plate 72 may be switched between the transmissive state and the scattered state, and thus the transmission/reflection switching unit 71 may be switched between the transmissive state and the reflective state. Additionally, the space of the gap portion 23 does not necessarily exist in one of the front surface side and the back surface side of the polymer-dispersed liquid crystal plate 72.

According to the second configuration example of the display panel 12 described above, it is possible to switch the reflection characteristics of the display panel 12 by switching between the transmissive state and the reflective state of the transmission/reflection switching unit 71 having a simple structure. The transmission/reflection switching unit 71 is set in the reflective state in a state where an image is not displayed when the display panel 12 is turned off, for example, the reflection characteristics of the display panel 12 can be changed to a characteristic close to white or substantially white, which can provide a form in which the display panel is housed in a glass door having high reflection. Thus, the display apparatus can be fitted into the interior without being conspicuous in the room in which the display apparatus is installed, and the design property corresponding to a request of the user can be improved. Additionally, in the state of displaying an image on the display panel 12, the deterioration of the image can be prevented by setting the transmission/reflection switching unit 71 in the transmissive state.

Third Configuration Example of Display Panel 12

Figure 17:
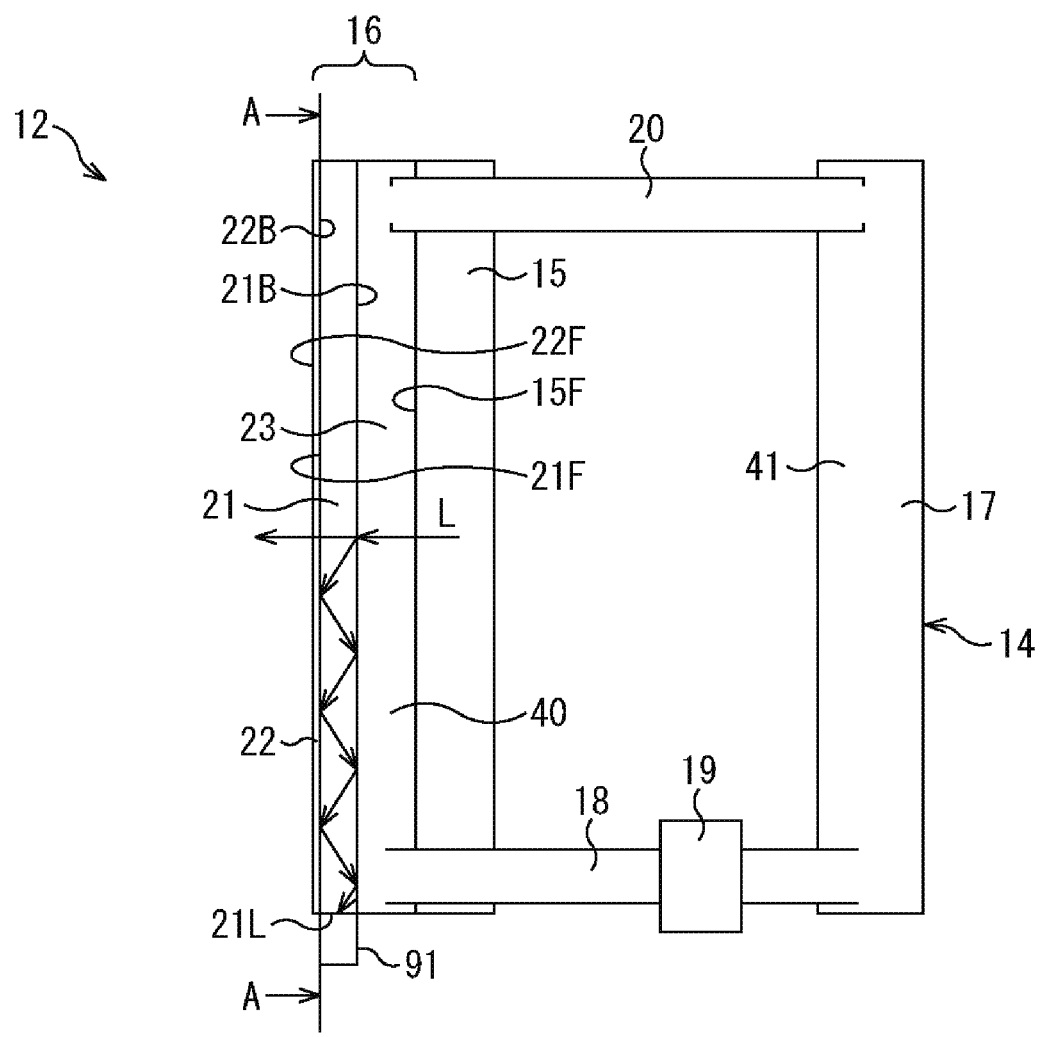
FIG. 17 is a vertical cross-sectional view showing a third configuration example of the display panel.

FIG. 17 is a vertical cross-sectional view showing a third configuration example of the display panel 12. Note that in FIG. 17, portions corresponding to those of the display panel 12 in FIG. 2 are denoted by the same reference numerals, and description thereof will be omitted as appropriate.

The display panel 12 of FIG. 17 is different from the case of FIG. 2 only in that a light receiving unit 91 is newly provided along the lower end surface (lower end surface 21L) of the plate-like body 21 of the transmission/reflection switching unit 16.

Figure 18:
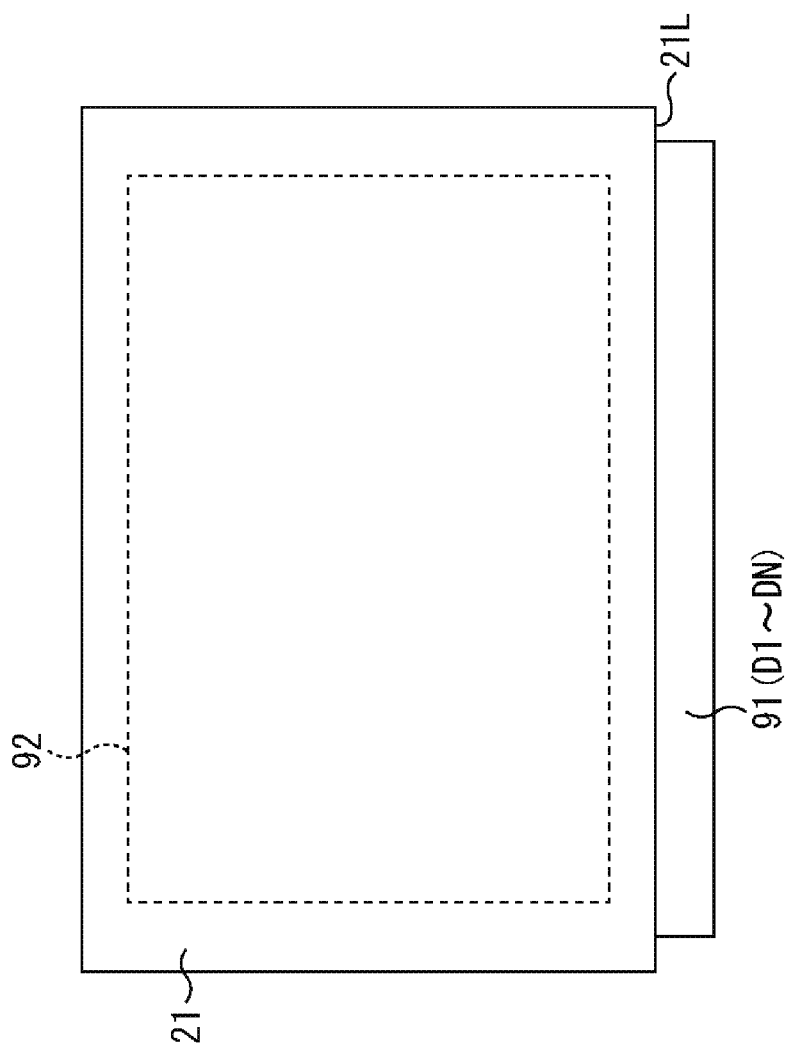
FIG. 18 is a view taken along the line A-A in FIG. 17.

FIG. 18 is a view taken along the line A-A in FIG. 17, showing a front surface 21F of the plate-like body 21 viewed from the front. In FIGS. 17 and 18, the light receiving unit 91 is provided along the lower end surface 21L of the plate-like body 21. The light receiving unit 91 includes a plurality of light receiving elements D1 to DN (N is a positive integer and represents the number of light receiving elements). The light receiving elements D1 to DN are arranged in a row in a direction along the lower end surface 21L of the plate-like body 21. Note that a one-dimensional image sensor may be used as the light receiving unit 91. Alternatively, the light receiving elements D1 to DN may be one light receiving element. Furthermore, the light receiving unit 91 may be provided on a side end surface other than the lower end surface 21L of the plate-like body 21 or may be provided on a plurality of side end surfaces.

Additionally, the light receiving elements D1 to DN of the light receiving unit 91 are each disposed with the upper side thereof (side facing the lower end surface 21L of the plate-like body 21) as a light receiving surface, and receive the light emitted from the lower end surface 21L of the plate-like body 21.

Furthermore, a screen range 92 in FIG. 18 indicates a range of the screen in which an image is displayed on the display 15. The light receiving elements D1 to DN of the light receiving unit 91 are disposed, for example, at equal intervals within the screen range 92 in the lateral direction. Note that in FIG. 18, it is assumed that the light receiving elements D1, D2, . . . DN are disposed in the stated order from the left side toward the right side of the light receiving unit 91.

Next, the action of the light receiving unit 91 will be described.

The transmission/reflection switching unit 16 is set in the reflective state, and the display panel 12 is set in the image display state. At that time, it is assumed that a test image of a predetermined pattern is displayed on the display 15. When image light L of a test image shown in FIG. 17 enters the plate-like body 21 from the gap portion 23, part of the image light L repeats reflection in the plate-like body 21. The image light L repeatedly reflected within the plate-like body 21 reaches the lower end surface 21L of the plate-like body 21 and is emitted from the lower end surface 21L. The image light L emitted from the lower end surface 21L is received by the light receiving elements D1 to DN of the light receiving unit 91, and the received light intensity of the image light L is detected. The received light intensity detected by each of the light receiving elements D1 to DN is output from the light receiving unit 91. As will be described later, the presence or absence of an abnormality in the gap portion 23 or the display 15 is determined on the basis of the received light intensity of each of the light receiving elements D1 to DN of the light receiving unit 91.

Determination Processing

Figure 19:
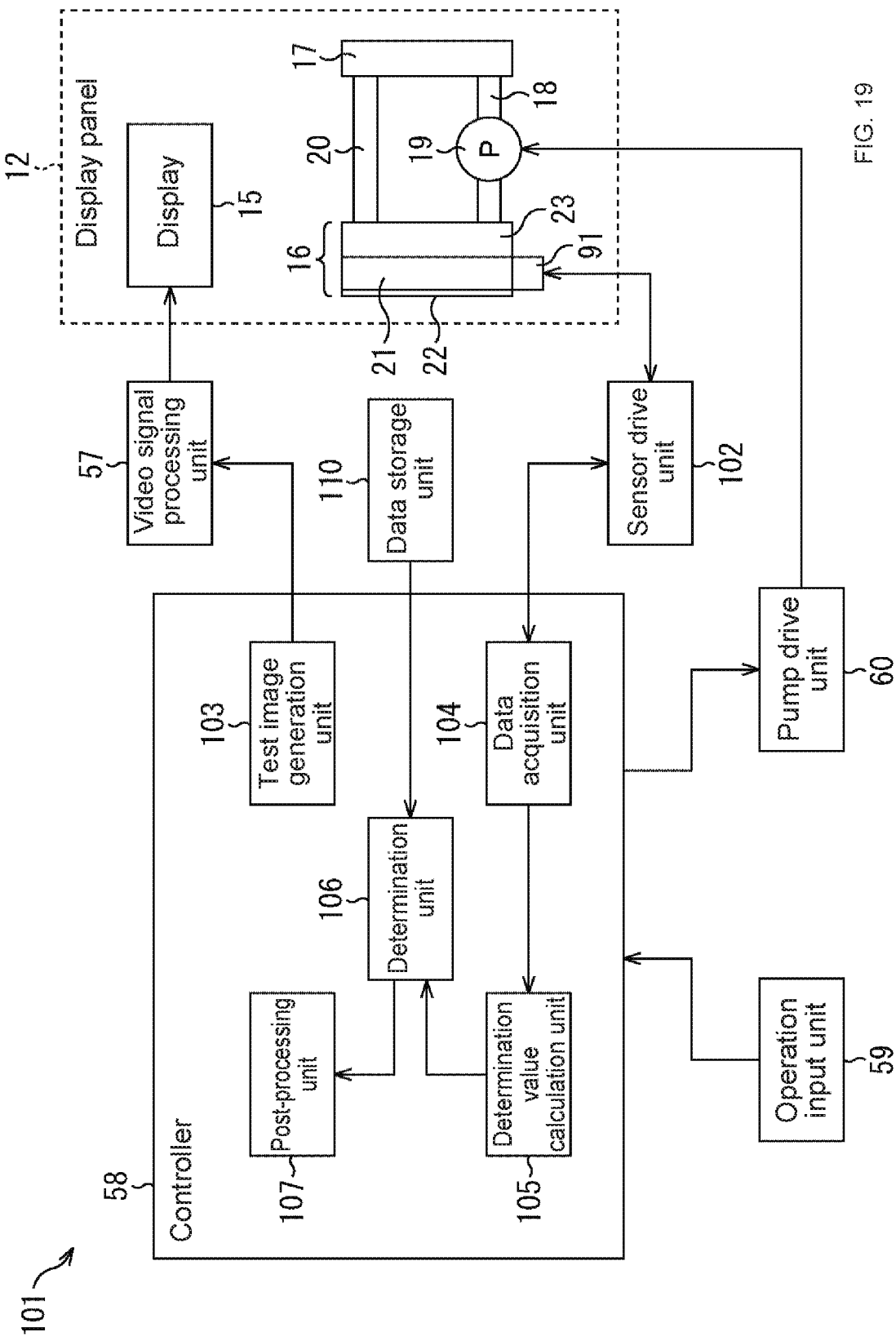
FIG. 19 is a block diagram showing a configuration example of a television receiver using the third configuration example of the display panel.

FIG. 19 is a block diagram showing a configuration example of a television receiver using the third configuration example of the display panel 12 of FIG. 17.

Note that in FIG. 19, portions corresponding to those of the television receiver 51 of FIG. 9 are denoted by the same reference numerals, and description thereof will be omitted as appropriate.

Additionally, in FIG. 19, the tuner 52, the demodulation unit 53, the separation unit 54, the audio signal processing unit 55, and the speaker 56 in FIG. 9 are omitted.

A television receiver 101 of FIG. 19 includes a display panel 12, a video signal processing unit 57, a controller 58, an operation input unit 59, a pump drive unit 60, a sensor drive unit 102, and a data storage unit 110. Therefore, the television receiver 101 of FIG. 19 is common to the case of FIG. 9 in that the display panel 12, the video signal processing unit 57, the controller 58, the operation input unit 59, and the pump drive unit 60 are provided. However, the television receiver 101 of FIG. 19 is different from the case of FIG. 9 in that the sensor drive unit 102 and the data storage unit 110 are newly provided.

Furthermore, the controller 58 of FIG. 19 includes a test image generation unit 103, a data acquisition unit 104, a determination value calculation unit 105, a determination unit 106, and a post-processing unit 107. Thus, the controller 58 of FIG. 19 is different from the case of FIG. 9 in that the test image generation unit 103, the data acquisition unit 104, the determination value calculation unit 105, the determining unit 106, and the post-processing unit 107 are newly provided.

In FIG. 19, the sensor drive unit 102 operates the light receiving unit 91 on the basis of an instruction from the data acquisition unit 104, to acquire the received light intensity detected by each of the light receiving elements D1 to DN and supply it to the data acquisition unit 104.

The test image generation unit 103 generates a test image to be described later and supplies the test image to the video signal processing unit 57. The video signal processing unit 57 displays the test image from the test image generation unit 103, in place of a video of a TV broadcast, on the display 15.

The data acquisition unit 104 acquires the received light intensity detected by each of the light receiving elements D1 to DN of the light receiving unit 91 from the sensor drive unit 102, and supplies the received light intensities to the determination value calculation unit 105.

The determination value calculation unit 105 calculates a determination value to be used for determination (detection) in the determination unit 106, on the basis of the received light intensities from the data acquisition unit 104, and supplies the determination value to the determination unit 106.

The determination unit 106 determines, on the basis of the determination value from the determination value calculation unit 105, the storage amount (liquid amount) of the liquid 40 in the gap portion 23, the presence or absence of a filling abnormality of the liquid 40 (gas 41) in the gap portion 23, the presence or absence of a display abnormality (luminance, degradation of color, etc.) in the display 15, or the like. The determination unit 106 then supplies a determination result to the post-processing unit 107.

The post-processing unit 107 performs processing according to the determination result from the determination unit 106. For example, the post-processing unit 107 generates an image representing the determination result and supplies the image to the video signal processing unit 57. The video signal processing unit 57 displays the image from the post-processing unit 107, in place of a video of a TV broadcast or by being superimposed on the video, on the display 15.

The data storage unit 110 stores a reference value such as an actual measured value to be referred to by the determination unit 106.

Figure 20:
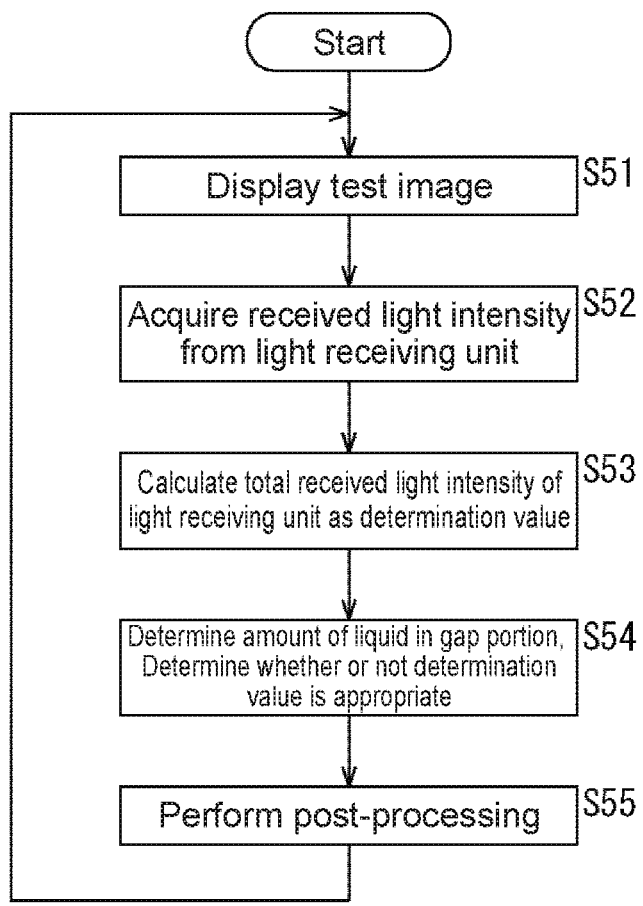
FIG. 20 is a flowchart for describing an example of determination processing performed by the controller using the detection of image light by a light receiving unit.

FIG. 20 is a flowchart for describing an example of the determination processing performed by the controller 58 of FIG. 19 while using the detection of the received light intensity of the image light by the light receiving unit 91.

In Step S51, the test image generation unit 103 (see FIG. 19) generates an image to fill the entire screen of the display 15 with, for example, white as a test image, and supplies the image to the video signal processing unit 57. Thus, the test image is displayed on the display 15. Note that the test image may have any color other than white. The processing proceeds from Step S51 to Step S52.

In Step S52, the data acquisition unit 104 acquires, when the test image is displayed on the display 15, the received light intensity detected by each of the light receiving elements D1 to DN of the light receiving unit 91 from the sensor drive unit 102, and supplies the received light intensities to the determination value calculation unit 105. The processing proceeds from Step S52 to Step S53.

In Step S53, the determination value calculation unit 105 calculates, as a determination value, the total received light intensity obtained by adding all the received light intensities of the respective light receiving elements D1 to DN supplied from the data acquisition unit 104 in Step S52, and supplies the determination value to the determination unit 106. The processing proceeds from Step S53 to Step S54. Note that in the following description, the total received light intensity obtained by adding all the light receiving intensities of the respective light receiving elements D1 to DN is referred to as the total received light intensity of the light receiving unit 91, or simply as the total received light intensity.

In Step S54, the determination unit 106 determines the amount of liquid in the gap portion 23 on the basis of the determination value from the determination value calculation unit 105 and the reference value stored in the data storage unit 110, or determines whether or not the determination value is appropriate. Note that the determination unit 106 may perform only one of the determinations.

First, a case of determining the amount of liquid in the gap portion 23 will be described. In the data storage unit 110, during the period from when the transmission/reflection switching unit 16 is in the reflective state to when transmission/reflection switching unit 16 enters the transmissive state, an actual measured value of the total received light intensity of the light receiving unit 91, which is measured while increasing the amount of liquid in the gap portion 23 by a predetermined amount and while displaying the test image on the display 15, is stored as a reference value in association with amount information representing the amount of liquid in the gap portion 23.

The determination unit 106 determines the amount of liquid, represented by the liquid amount information associated with an actual measured value, as the current amount of liquid in the gap portion 23. Such an actual measured value is closest to the determination value supplied from the determination value calculation unit 105 in Step S53 among the actual measured values stored in the data storage unit 110. The determination unit 106 then supplies, as a determination result, the determined amount of liquid in the gap portion 23 to the post-processing unit 107. The processing proceeds from Step S54 to Step S55. Note that the liquid amount information does not need to be a value of the amount of liquid itself and may be a ratio of the amount of liquid in the gap portion 23 to the maximum value, or the like, as long as the liquid amount information is information representing the amount of liquid in the gap portion 23.

In Step S55, the post-processing unit 107 performs post-processing according to the determination result supplied from the determination unit 106 in Step S54. For example, the post-processing unit 107 generates an image representing the determination result (the amount of liquid in the gap portion 23) from the determination unit 106 and supplies the image to the video signal processing unit 57. The video signal processing unit 57 displays the image from the post-processing unit 107, in place of the video of the TV broadcast or by being superimposed on the video of the TV broadcast, on the display 15.

Additionally, when the transmission/reflection switching unit 16 is switched from the reflective state to the transmissive state or switched from the transmissive state to the reflective state, the determination processing of the flowchart of FIG. 20 is performed, and thus the post-processing unit 107 can determine the stop of the pump 19.

In other words, when the transmission/reflection switching unit 16 is switched from the reflective state to the transmissive state, the determination processing of the flowchart of FIG. 20 is repeatedly executed instead of Step S13 of FIG. 10. In Step S55, the post-processing unit 107 then stops the pump 19 when it is detected, on the basis of the amount of liquid in the gap portion 23 supplied from the determination unit 106 in Step S54, that the liquid 40 has been stored in the gap portion 23 up to the amount of liquid at which the transmission/reflection switching unit 16 enters the transmissive state. The same applies to the case where the transmission/reflection switching unit 16 is switched from the transmissive state to the reflective state, and thus description thereof will be omitted.

Meanwhile, a case of determining whether or not the determination value is appropriate in Step S54 of the flowchart of FIG. 20 will be described. In this case, it is assumed that, when the transmission/reflection switching unit 16 is set in the transmissive state or the reflective state, the determination processing of the flowchart of FIG. 20 is performed. Actual measured values of the total received light intensity of the light receiving unit 91, which are measured while displaying the test image on the display 15 when the transmission/reflection switching unit 16 is set in the transmissive state and when it is set in the reflective state, are stored in the data storage unit 110 as reference values.

If the determination processing of the flowchart of FIG. 20 is performed when the transmission/reflection switching unit 16 is set in the transmissive state, the determination unit 106 reads, from the data storage unit 110, the actual measured value of the total received light intensity obtained when the transmission/reflection switching unit 16 is set in the transmissive state. If the determination value supplied from the determination value calculation unit 105 in Step S53 is within the error range with respect to the read actual measured value, the determination value is determined to be appropriate. If the determination value is outside the error range, the determination value is determined to be inappropriate. The determination unit 106 then supplies a determination result to the post-processing unit 107.

In Step S55, if the determination result supplied from the determination unit 106 in Step S54 indicates that the determination value is inappropriate, the post-processing unit 107 determines a filling abnormality of the liquid 40 in the gap portion 23 or a display abnormality (luminance, degradation of color, etc.) in the display 15. In other words, the post-processing unit 107 determines that the gap portion 23 is not sufficiently filled with the liquid 40 or that the display on the display 15 is not appropriately performed. Note that if the determination value is inappropriate, a predetermined one of the filling abnormality of the liquid 40 in the gap portion 23 and the display abnormality in the display 15 may be determined.

Alternatively, if the determination result supplied from the determination unit 106 in Step S54 indicates that the determination value is inappropriate, for example, the post-processing unit 107 generates an image for notifying the filling abnormality of the liquid 40 in the gap portion 23 or the display abnormality in the display 15 and supplies the image to the video signal processing unit 57. The video signal processing unit 57 displays the image from the post-processing unit 107, in place of the video of the TV broadcast or by being superimposed on the video of the TV broadcast, on the display 15.

Note that if the result indicates that the determination value is inappropriate, the post-processing unit 107 may instruct the pump drive unit 60 to drive the pump 19 to supply the liquid 40 to the gap portion 23. Alternatively, if the result indicates that the determination value is appropriate, the post-processing unit 107 may generate an image for notifying that the gap portion 23 and the display 15 are normal, supply the image to the video signal processing unit 57, and display the image on the display 15, or does not need to perform special processing as post-processing.

Additionally, if the determination processing of the flowchart of FIG. 20 is performed when the transmission/reflection switching unit 16 is set in the reflective state, as in the case where the transmission/reflection switching unit 16 is set in the transmissive state, the post-processing unit 107 is capable of determining the presence or absence of the filling abnormality of the gas 41 in the gap portion 23 or the presence or absence of a display abnormality (luminance, degradation of color, etc.) in the display 15. Note that detailed description thereof will be omitted.

Furthermore, in Step S51, the test image generation unit 103 may generate a test image to fill the entire screen of the display 15 with one color for each color type (R, G, B, etc.) of the pixels of the display 15 or for each of a plurality of optional colors, and then display the test image on the display 15. In this case, the determination processing of the flowchart of FIG. 20 is performed for each test image of each color. If the determination unit 106 determines in Step S54 that the determination values for the test images in some of the plurality of colors, which are displayed as the test images, are inappropriate, in Step S55, the post-processing unit 107 is capable of identifying not the filling abnormality of the liquid 40 (or the gas 41) in the gap portion 23 but the display abnormality in the display 15, and also capable of identifying the color in which the abnormality has occurred. If the determination unit 106 determines that the determination values for the test images of all colors are inappropriate, the post-processing unit 107 is capable of determining the filling abnormality of the gap portion 23 or the display abnormality of the display 15.

Additionally, instead of changing the color of the test image, the light receiving unit 91 may detect the received light intensity for each of the plurality of colors by using a color sensor as the light receiving elements D1 to DN. In this case, for example, in Step S53, the determination value calculation unit 105 calculates the total received light intensity for each color as a determination value, and in Step S54, the determination unit 106 determines whether or not the determination value is appropriate for each color. As a result, the post-processing unit 107 is capable of determining the filling abnormality of the gap 23 or the display abnormality of the display 15, as in the case of changing the color of the test image.

Note that the received light intensity is sequentially detected by the light receiving unit 91 while the display pattern serving as a test image is moved within the screen, and thus a place where the display abnormality occurs can also be detected.

According to the third configuration example of the display panel 12 described above, it is possible to switch the reflection characteristics of the display panel 12 by switching between the transmissive state and the reflective state of the transmission/reflection switching unit 16 having a simple structure. The transmission/reflection switching unit 16 is set in the reflective state in a state where an image is not displayed when the display panel 12 is turned off, for example, and thus the reflection characteristics of the display panel 12 can be changed to a characteristic close to white or substantially white, which can provide a form in which the display panel is housed in a glass door having high reflection. Thus, the display apparatus can be fitted into the interior without being conspicuous in the room in which the display apparatus is installed, and the design property corresponding to a request of the user can be improved. Additionally, in the state of displaying an image on the display panel 12, the deterioration of the image can be prevented by setting the transmission/reflection switching unit 16 in the transmissive state.

Furthermore, providing the light receiving unit 91 allows the amount of liquid in the gap portion 23 and the presence or absence of an abnormality in the gap portion 23 or the display 15 to be determined with a simple configuration. Note that, similarly to the third configuration example of the display panel 12, the light receiving unit 91 may be provided on a side end surface of the plate-like body 21 in the second configuration example of the display panel 12 shown in FIG. 12 or the like. Also in such a case, the effects similar to those in the third configuration example of the display panel 12 are produced.

As described above, the present technology can be applied not only to the display apparatus of the television receiver but also to all of the display apparatuses for displaying images, such as a personal computer (PC).

The present technology can also be configured as follows.

<1> A display apparatus, including:
a display configured to display an image and having a front surface;
a plate-like body provided along the front surface of the display and configured to transmit image light emitted from the front surface of the display; and
a gap portion formed between the front surface of the display and the plate-like body and configured to switch between a state filled with a fluid and a state where the fluid is discharged.

<2> The display apparatus according to <1>, in which
the fluid is a first fluid, and
in a state where the first fluid is discharged from the gap portion, the gap portion is filled with a second fluid having a smaller refractive index than a refractive index of the first fluid.

<3> The display apparatus according to <2>, in which
the first fluid is liquid, and
the second fluid is gas.

<4> The display apparatus according to <2> or <3>, in which
a difference in refractive index between the plate-like body and the first fluid is smaller than a difference in refractive index between the plate-like body and the second fluid.

<5> The display apparatus according to <3> or <4>, in which
the second fluid is air.

<6> The display apparatus according to any one of <1> to <5>, in which
the plate-like body has a back surface facing the front surface of the display and includes irregularities on the back surface.

<7> The display apparatus according to <6>, in which
the irregularities each have a hemispherical shape.

<8> The display apparatus according to any one of <1> to <7>, in which
the gap portion includes a polymer-dispersed liquid crystal layer.

<9> The display apparatus according to any one of <1> to <8>, further including
a light receiving unit configured to detect image light emitted from at least one side end surface of the plate-like body, in the image light emitted from the front surface of the display.

<10> The display apparatus according to <9>, further including
a display abnormality determination unit configured to determine presence or absence of an abnormality of the display on the basis of a received light intensity of the image light detected by the light receiving unit.

<11> The display apparatus according to <9> or <10>, further including
a gap portion abnormality determination unit configured to determine presence or absence of an abnormality of the gap portion on the basis of a received light intensity of the image light detected by the light receiving unit.

<12> The display apparatus according to any one of <9> to <11>, further including
a liquid amount determination unit configured to determine an amount of liquid in the gap portion on the basis of a received light intensity of the image light detected by the light receiving unit.

<13> The display apparatus according to any one of <9> to <12>, in which
the light receiving unit detects a received light intensity for each of a plurality of colors.

<14> The display apparatus according to any one of <1> to <13>, further including
a supply/discharge unit configured to supply or discharge the fluid to and from the gap portion.
<15> The display apparatus according to <14>, in which the supply/discharge unit includes
a reservoir configured to store the fluid discharged from the gap portion,
a supply/discharge passage configured to connect the gap portion and the reservoir to each other, and
a pump configured to feed the fluid from the reservoir to the gap portion or feed the fluid from the gap portion to the reservoir, via the supply/discharge passage.

It should be understood by those skilled in the art that various modifications, combinations, sub-combinations and alterations may occur depending on design requirements and other factors insofar as they are within the scope of the appended claims or the equivalents thereof.

What is claimed is:

1. A display apparatus, comprising:
a display panel configured to display an image, wherein the display panel has a front surface;
a plate-like body along the front surface of the display panel, wherein the plate-like body is configured to transmit image light emitted from the front surface of the display panel;
a gap portion between the front surface of the display panel and the plate-like body, wherein the gap portion includes a polymer-dispersed liquid crystal layer; and
a controller configured to switch between a first state of the display apparatus and a second state of the display apparatus, wherein
in the first state, a first fluid is filled in the gap portion, and
in the second state, the first fluid is discharged from the gap portion, and a second fluid is filled in the gap portion.

2. The display apparatus according to claim 1, wherein the second fluid has a refractive index smaller than a refractive index of the first fluid.

3. The display apparatus according to claim 1, wherein the first fluid is liquid, and
the second fluid is gas.

4. The display apparatus according to claim 3, wherein the second fluid is air.

5. The display apparatus according to claim 1, wherein a first difference between a refractive index of the plate-like body and a refractive index of the first fluid is smaller than a second difference between the refractive index of the plate-like body and a refractive index of the second fluid.

6. The display apparatus according to claim 1, wherein the plate-like body has a back surface that faces the front surface of the display panel, and
the back surface has irregularities.

7. The display apparatus according to claim 6, wherein each of the irregularities has a hemispherical shape.

8. The display apparatus according to claim 1, further comprising a light receiving unit configured to detect the image light emitted from at least one side end surface of the plate-like body.

9. The display apparatus according to claim 8, further comprising a display abnormality determination unit configured to determine one of presence or absence of an abnormality of a display of the display panel based on a received light intensity of the image light.

10. The display apparatus according to claim 8, further comprising a gap portion abnormality determination unit configured to determine one of presence or absence of an abnormality of the gap portion based on a received light intensity of the image light.

11. The display apparatus according to claim 8, further comprising a liquid amount determination unit configured to determine an amount of liquid in the gap portion based on a received light intensity of the image light, wherein the amount of liquid is associated with one of the first fluid or the second fluid.

12. The display apparatus according to claim 8, wherein the light receiving unit is further configured to detect a received light intensity of the image light for each color of a plurality of colors.

13. The display apparatus according to claim 1, further comprising
a supply/discharge unit configured to one of:
supply at least one of the first fluid or the second fluid to the gap portion; or
discharge the at least one of the first fluid or the second fluid from the gap portion.

14. The display apparatus according to claim 13, wherein the supply/discharge unit includes:
a reservoir configured to store the at least one of the first fluid or the second fluid discharged from the gap portion,
a supply/discharge passage between the gap portion and the reservoir, and
a pump configured to:
feed, via the supply/discharge passage, the at least one of the first fluid or the second fluid from the reservoir to the gap portion, or
feed, via the supply/discharge passage, the at least one of the first fluid or the second fluid from the gap portion to the reservoir.

* * * * *